(12) United States Patent
Mullin et al.

(10) Patent No.: US 6,982,532 B2
(45) Date of Patent: Jan. 3, 2006

(54) ELECTRIC MACHINE

(75) Inventors: Paul Steven Mullin, Xenia, OH (US); Albert Keith Pant, Carlisle, OH (US); Dan Mircea Ionel, Fox Point, WI (US); Brian Thomas Branecky, Oconomowoc, WI (US); William Louis Mehlhorn, Menomonee Falls, WI (US); Alan Edward Lesak, Franklin, WI (US); Anthony Joseph Coloma, Troy, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/730,153

(22) Filed: Dec. 8, 2003

(65) Prior Publication Data

US 2005/0122073 A1   Jun. 9, 2005

(51) Int. Cl.
*H02P 6/00* (2006.01)
(52) U.S. Cl. ..................... 318/254; 318/293
(58) Field of Classification Search ............ 318/138, 318/254, 280, 287, 291, 293, 294, 439, 720–722
See application file for complete search history.

(56) References Cited

U.S. PATENT DOCUMENTS

| | | |
|---|---|---|
| 3,024,377 A | 3/1962 | Tupper |
| 3,604,961 A | 9/1971 | Saldinger |
| 3,778,897 A | 12/1973 | Bock et al. |
| 3,805,134 A | 4/1974 | Osamu et al. |
| 3,809,935 A | 5/1974 | Kristen et al. |
| 3,912,956 A | 10/1975 | Muller |
| 3,964,903 A | 6/1976 | Van Besauw et al. |

(Continued)

FOREIGN PATENT DOCUMENTS

DE           310129 A1    8/1982

(Continued)

OTHER PUBLICATIONS

Statement of Relevance for foreign patent Nos. DE3101629A1; DE29516656U1; and EP0286905B1; 1 page.

(Continued)

*Primary Examiner*—Bentsu Ro
(74) *Attorney, Agent, or Firm*—Michael Best & Friedrich LLP

(57) ABSTRACT

An electric machine having a stator assembly that includes a stator core and a coil supported by the stator core and a rotor assembly that includes a shaft and a rotor supported by the shaft that is in magnetic interaction with the stator core. The electric machine may include a single sensor configured to detect magnetic polarities of the rotor as the rotor rotates relative to the sensor and to generate a signal representing the detected magnetic polarities of the rotor. The signal and an inverted version of the signal are utilized to control current through the coil. The current may be controlled indirectly by controlling the application of voltage to the coil. The sensor may be encapsulated on a circuit board to positively position the sensor relative to the circuit board. The circuit board may be mounted to a bearing housing of the electric machine. The sensor may be received in a pocket of a bearing housing of the electric machine so the sensor is positively positioned relative to the rotor. The rotor may be connected to the shaft with an encapsulation material. The rotor may be formed as a single cylinder of ferrite. A tapered air gap may be formed between a portion of the stator core and a corresponding portion of the rotor. The electric machine may be a C-frame electric motor with the I-bar portion formed of grain-oriented electric steel.

74 Claims, 10 Drawing Sheets

U.S. PATENT DOCUMENTS

| | | |
|---|---|---|
| 3,969,645 A | 7/1976 | Spotts et al. |
| 3,983,621 A | 10/1976 | Donahoo |
| 4,007,390 A | 2/1977 | Muller et al. |
| 4,013,910 A | 3/1977 | Deming |
| 4,086,533 A | 4/1978 | Ricouard et al. |
| 4,134,035 A | 1/1979 | Donahoo |
| 4,174,484 A | 11/1979 | Schmider |
| 4,181,867 A | 1/1980 | Muller |
| 4,217,508 A | 8/1980 | Uzuka |
| 4,230,976 A | 10/1980 | Muller |
| 4,259,603 A | 3/1981 | Uchiyama et al. |
| 4,338,535 A | 7/1982 | Kohzai et al. |
| 4,376,261 A | 3/1983 | von der Heide et al. |
| 4,427,462 A | 1/1984 | Senno et al. |
| 4,473,766 A | 9/1984 | Obergfell et al. |
| 4,482,832 A | 11/1984 | Minton |
| 4,540,906 A | 9/1985 | Blom |
| 4,546,300 A | 10/1985 | Shaikh |
| 4,554,473 A | 11/1985 | Muller |
| 4,573,003 A | 2/1986 | Lipo |
| 4,600,864 A | 7/1986 | Sato |
| 4,603,664 A | 8/1986 | Jackson |
| 4,604,665 A | 8/1986 | Muller et al. |
| 4,618,797 A | 10/1986 | Cline |
| 4,638,201 A | 1/1987 | Feigel |
| 4,641,422 A | 2/1987 | Weaver |
| 4,647,803 A | 3/1987 | von der Heide et al. |
| 4,668,898 A | 5/1987 | Harms et al. |
| 4,698,542 A | 10/1987 | Muller |
| 4,701,654 A | 10/1987 | Tatukawa et al. |
| 4,707,910 A | 11/1987 | Saeed |
| 4,728,834 A | 3/1988 | Kumar et al. |
| 4,734,606 A | 3/1988 | Hajec |
| RE32,654 E | 4/1988 | Jackson, Jr. |
| 4,755,728 A * | 7/1988 | Ban .......................... 318/254 |
| 4,758,751 A | 7/1988 | Hosoya et al. |
| 4,769,567 A | 9/1988 | Kurauchi et al. |
| 4,874,527 A | 10/1989 | Gill |
| 4,882,511 A | 11/1989 | von der Heide |
| 4,883,997 A | 11/1989 | DeCesare |
| 4,910,420 A | 3/1990 | Hoover et al. |
| 4,934,014 A | 6/1990 | Yamamoto |
| 4,934,041 A | 6/1990 | Hoover et al. |
| 4,942,323 A | 7/1990 | DeCesare |
| 4,973,872 A | 11/1990 | Dohogne |
| 4,988,905 A | 1/1991 | Tolmie, Jr. |
| 4,992,162 A | 2/1991 | Kuerston et al. |
| 4,992,688 A | 2/1991 | Cap et al. |
| 4,998,032 A | 3/1991 | Burgbacher |
| 5,008,573 A | 4/1991 | Beppu et al. |
| 5,030,867 A | 7/1991 | Yamada et al. |
| RE33,813 E | 2/1992 | von der Heide et al. |
| 5,086,245 A | 2/1992 | Sieja et al. |
| 5,107,159 A | 4/1992 | Kordik |
| 5,109,174 A | 4/1992 | Shewell |
| 5,130,591 A | 7/1992 | Sato |
| 5,148,070 A | 9/1992 | Frye et al. |
| 5,170,083 A | 12/1992 | Burgbacher |
| 5,173,628 A | 12/1992 | Yoshida et al. |
| RE34,268 E | 6/1993 | Muller |
| 5,248,911 A | 9/1993 | Joseph |
| 5,252,873 A | 10/1993 | Hamamoto et al. |
| 5,258,697 A | 11/1993 | Ford et al. |
| 5,298,826 A | 3/1994 | Lee et al. |
| 5,319,270 A | 6/1994 | Tanaka et al. |
| 5,331,245 A | 7/1994 | Burgbacher et al. |
| 5,343,104 A | 8/1994 | Takahashi et al. |
| 5,345,129 A | 9/1994 | Molnar |
| 5,349,275 A | 9/1994 | Muller |
| 5,357,160 A | 10/1994 | Kaneda et al. |
| 5,394,043 A | 2/1995 | Hsai |
| 5,410,201 A | 4/1995 | Tanaka et al. |
| 5,436,519 A | 7/1995 | Takahashi et al. |
| 5,457,350 A | 10/1995 | Sakamaki et al. |
| 5,461,270 A | 10/1995 | Didier |
| 5,488,260 A | 1/1996 | Heyraud |
| 5,552,653 A | 9/1996 | Nose |
| 5,578,883 A | 11/1996 | Sakashita et al. |
| 5,610,457 A | 3/1997 | Kurita |
| 5,610,458 A | 3/1997 | Baker et al. |
| 5,610,462 A | 3/1997 | Takahashi |
| 5,619,086 A | 4/1997 | Steiner |
| 5,627,423 A | 5/1997 | Marioni |
| 5,627,424 A | 5/1997 | Steiner |
| 5,629,574 A | 5/1997 | Cognetti et al. |
| 5,650,678 A | 7/1997 | Yokozawa et al. |
| 5,650,679 A | 7/1997 | Boggs, III et al. |
| 5,659,217 A | 8/1997 | Petersen |
| 5,663,604 A | 9/1997 | Takahashi |
| 5,670,836 A | 9/1997 | Horst |
| 5,684,352 A | 11/1997 | Mita et al. |
| 5,698,919 A | 12/1997 | Obara |
| RE35,763 E | 4/1998 | Burgbacher |
| 5,747,908 A | 5/1998 | Saneshige et al. |
| 5,767,639 A | 6/1998 | Sakaguchi et al. |
| 5,783,880 A | 7/1998 | Teshima et al. |
| 5,783,881 A | 7/1998 | Best et al. |
| 5,783,890 A | 7/1998 | Mulgrave |
| 5,796,204 A | 8/1998 | Woo |
| 5,798,589 A | 8/1998 | Ohi et al. |
| 5,818,133 A | 10/1998 | Kershaw et al. |
| 5,844,346 A | 12/1998 | Kolomeitsev et al. |
| 5,877,574 A | 3/1999 | Molnar |
| 5,881,447 A | 3/1999 | Molnar |
| 5,881,448 A | 3/1999 | Molnar |
| 5,883,455 A | 3/1999 | Fukasawa et al. |
| 5,925,948 A | 7/1999 | Matsumoto |
| 5,927,249 A | 7/1999 | Ackermann et al. |
| 5,982,066 A | 11/1999 | Marracino et al. |
| 5,990,589 A | 11/1999 | Ushikoshi |
| 5,996,209 A | 12/1999 | Molnar et al. |
| 6,005,312 A | 12/1999 | Yamane |
| 6,020,660 A | 2/2000 | Wright |
| 6,061,724 A | 5/2000 | Ries et al. |
| 6,069,421 A | 5/2000 | Smith et al. |
| 6,069,428 A | 5/2000 | Nelson |
| RE36,860 E | 9/2000 | Muller |
| 6,118,198 A | 9/2000 | Hollenbeck et al. |
| 6,133,666 A | 10/2000 | Hollenbeck et al. |
| 6,144,124 A | 11/2000 | Nakagawa et al. |
| 6,160,334 A | 12/2000 | Teshima et al. |
| 6,183,136 B1 | 2/2001 | Dingman |
| 6,194,800 B1 | 2/2001 | Maruyama et al. |
| 6,204,584 B1 | 3/2001 | Muszynski |
| 6,211,635 B1 | 4/2001 | Kambe et al. |
| 6,232,687 B1 | 5/2001 | Hollenbeck et al. |
| 6,239,532 B1 | 5/2001 | Hollenbeck et al. |
| 6,271,609 B1 | 8/2001 | Hollenbeck et al. |
| 6,271,638 B1 | 8/2001 | Erdman et al. |
| 6,300,695 B1 | 10/2001 | Neal |
| 6,307,337 B1 | 10/2001 | Nelson |
| 6,310,455 B1 | 10/2001 | Siraky et al. |
| 6,320,288 B1 | 11/2001 | Suzuki et al. |
| 6,324,745 B1 | 12/2001 | Poag et al. |
| 6,335,582 B1 | 1/2002 | Abukawa et al. |
| 6,348,752 B1 | 2/2002 | Erdman et al. |
| 6,362,554 B1 | 3/2002 | Neal |
| 6,414,408 B1 | 7/2002 | Erdman et al. |
| 6,437,464 B1 | 8/2002 | Neal |
| 6,479,957 B1 | 11/2002 | Erdman et al. |
| 6,497,035 B1 | 12/2002 | Ratliff |
| 6,501,202 B1 | 12/2002 | Whaley |
| 6,522,046 B2 | 2/2003 | Ikeda et al. |
| 6,532,193 B1 | 3/2003 | Fehse et al. |

| | | | |
|---|---|---|---|
| 6,617,721 | B1 | 9/2003 | Neal |
| 2001/0024068 | A1 | 9/2001 | Aizawa et al. |
| 2002/0021052 | A1 | 2/2002 | Asao |
| 2002/0109426 | A1 | 8/2002 | Peter et al. |
| 2003/0098660 | A1 | 5/2003 | Erdman et al. |
| 2003/0178903 | A1 | 9/2003 | Rapp |

FOREIGN PATENT DOCUMENTS

| | | |
|---|---|---|
| DE | 29516656 U1 | 1/1996 |
| EP | 0376530 A2 | 7/1990 |
| EP | 0286905 B1 | 7/1993 |
| EP | 0565312 A2 | 10/1993 |
| EP | 0926448 B1 | 6/1999 |
| EP | 0836008 B1 | 11/2002 |
| GB | 2072431 A | 9/1981 |
| JP | 1264556 A | 10/1989 |
| JP | 2111248 A | 4/1990 |

OTHER PUBLICATIONS

Eclercy et al.; Info; mv1 Motoren Ventilatoren; Motoren Ventilatoren Landshut GmbH; Sep. 2001; 8 pages.

A. O. Smith; Fractional Horsepower Motors and Specialty Blowers; Bulletin 7000; Jan. 2001; 8 pages.

Barber-Colman Company; Shaded-Pole Motors; type GYAZ Reversible Geared Motors; Rockford, Illinois; Feb. 1969; 2 pages.

Barber-Colman Company; Shaded-Pole Motors; Types AYAE, DYAE, KYAE, OYAE Reversible for Electronic Control; Rockford, Illinois; Aug. 1969; 2 pages.

* cited by examiner

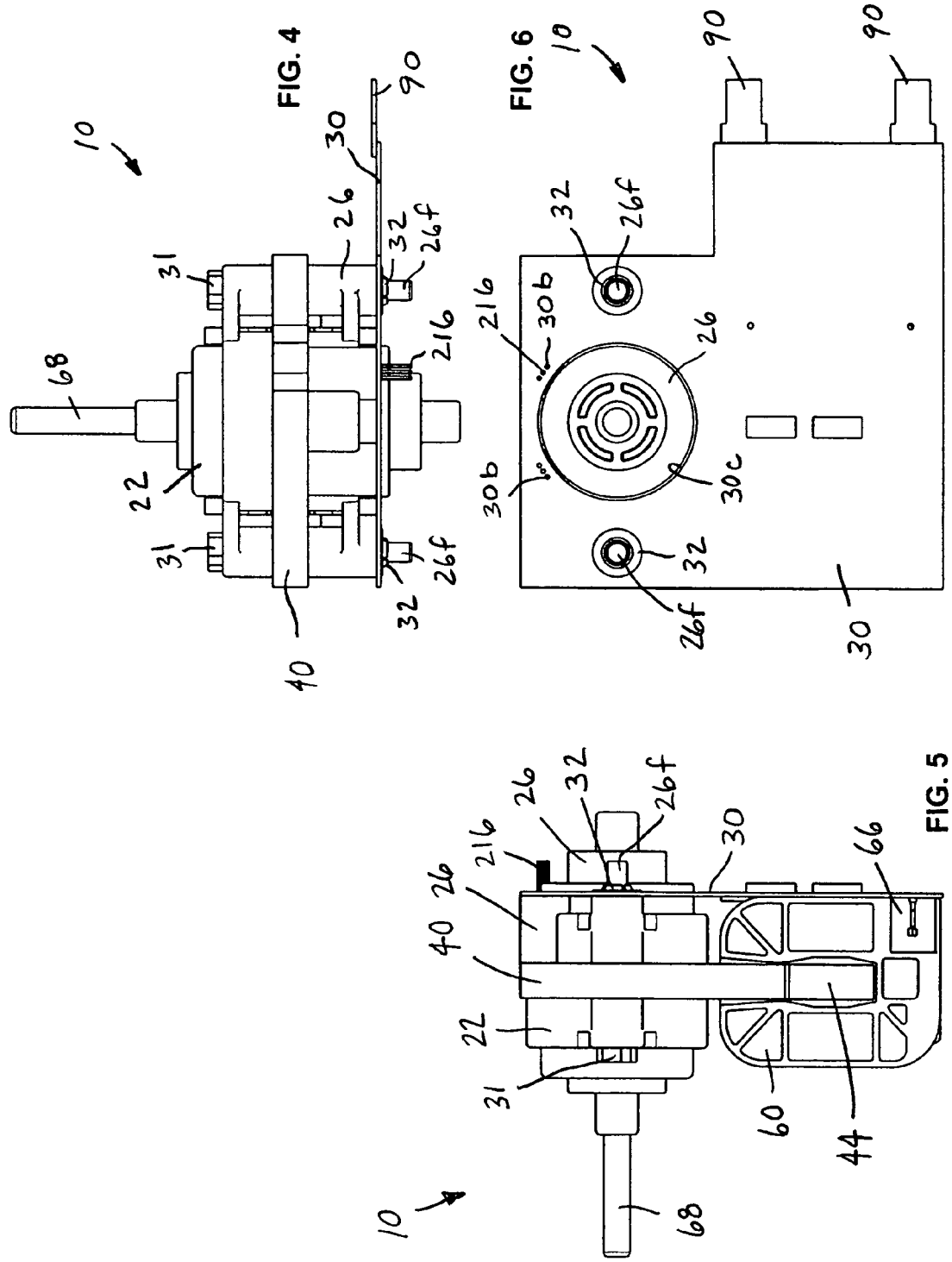

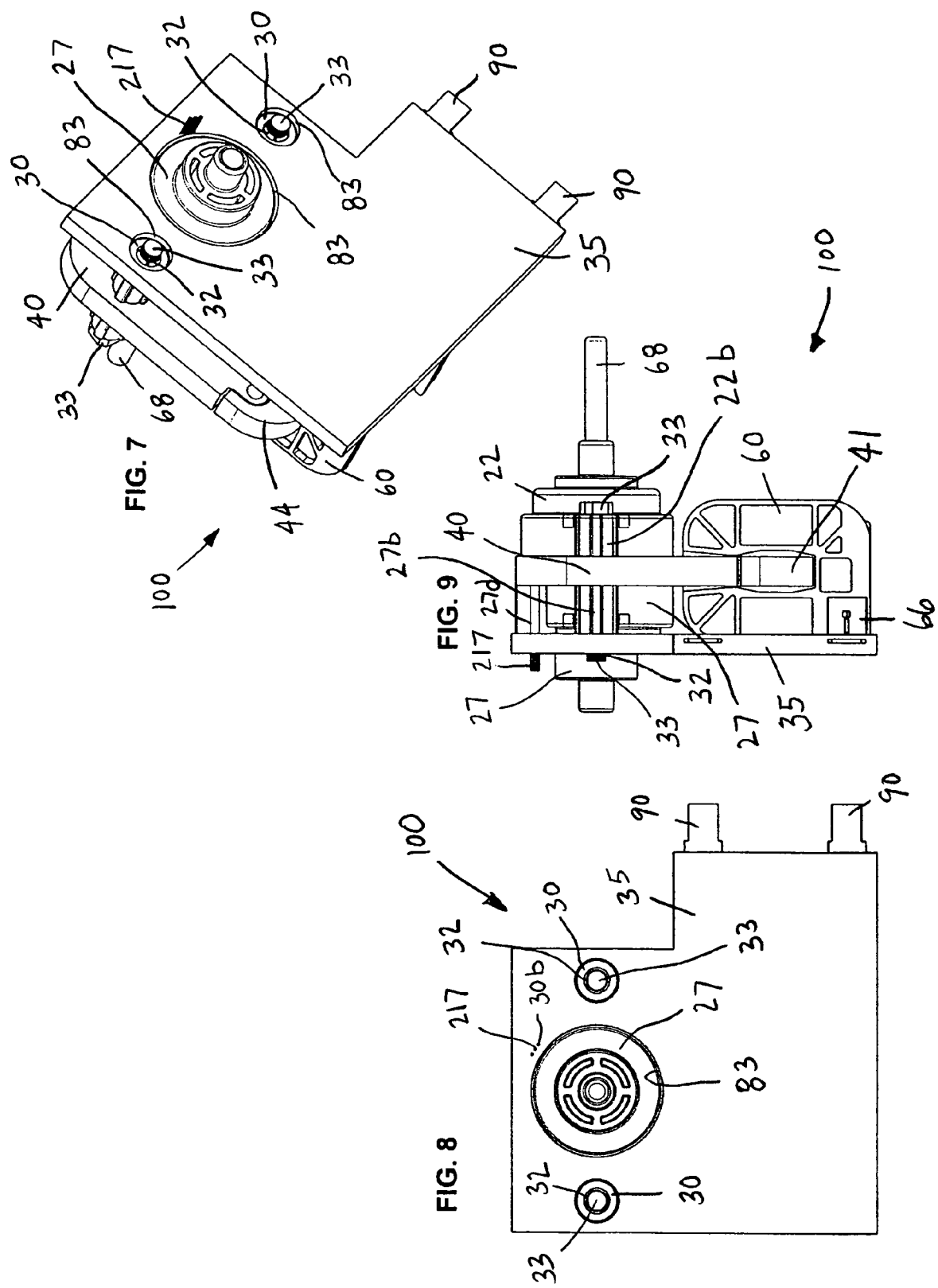

ELECTRIC MACHINE

BACKGROUND OF THE INVENTION

The invention relates to electric machines, and more particularly to electrically commutated C-frame electric motors.

C-frame electric motors are used in a wide range of applications including, among others, bathroom and kitchen ventilation fans, microwave oven fans, convection oven fans, furnaces, refrigerators, evaporative cooler fans, dishwashers, humidifiers, portable medical equipment, pumps, condenser fans, and the like. Improvements to C-frame electric motors that enhance performance and reduce costs would be welcomed by those in the art.

SUMMARY OF THE INVENTION

In one construction, the invention provides an electric machine having a stator assembly, a rotor assembly, and a single sensor. The stator assembly includes a stator core and a coil supported by the stator core. The rotor assembly includes a shaft and a rotor supported by the shaft for rotation with the shaft relative to the stator core. The rotor includes first and second magnetic poles and is in magnetic interaction with the stator core. The single sensor is configured to detect magnetic polarities of the rotor as the rotor rotates relative to the sensor and to generate a signal representing the detected magnetic polarities of the rotor. The signal is in a first state when the first magnetic pole is detected and a second state when the second magnetic pole is detected. The signal is inverted to form an inverted signal. The signal is utilized to control current through the coil in a first direction when the signal is in the first state and the inverted signal is utilized to control current through the coil in a second direction when the signal is in the second state. The current through the coil results in an alternating magnetic field in the stator core. In some constructions, the current is controlled indirectly (e.g., by controlling the voltage applied to the coil which produces the current through the coil).

In another construction, the invention provides an electric machine having a stator assembly, a rotor assembly, and a control circuit. The stator assembly includes a stator core and a coil assembly supported by the stator core. The stator core defines a rotor opening and the coil assembly includes a bobbin and a coil wound on the bobbin. The rotor assembly includes a shaft and a permanent magnet rotor supported by the shaft. The rotor rotates with the shaft relative to the stator core, includes first and second magnetic poles, is at least partially positioned in the rotor opening, and is in magnetic interaction with the stator core. The control circuit is configured to receive power from a power supply and control a current through the coil. The current creates an alternating magnetic field in the stator core. The control circuit includes a single Hall device, an inverter, and a switching circuit. The Hall device detects magnetic polarities of the rotor as the rotor rotates relative to the Hall device and generates a signal representative of the detected magnetic polarities of the rotor. The signal is in a first state when the first magnetic pole is detected and a second state when the second magnetic pole is detected. The switching circuit is connected to the coil. The signal is utilized to control operation of the switching circuit to allow the current through the coil in a first direction when the signal is in the first state. The inverted signal is utilized to allow the current through the coil in a second direction when the signal is in the second state.

In another construction, the invention provides an electric machine having a stator assembly, a rotor assembly, first and second bearing housings, a circuit board, and first and second fasteners. The stator assembly includes a stator core and a coil supported by the stator core. The stator core defines a first bore. The rotor assembly includes a shaft, a rotor supported by the shaft for rotation with the shaft relative to the stator core, and first and second bearings secured to the shaft on opposite sides of the rotor. The first bearing housing receives the first bearing and defines a second bore which aligns with the first bore. The second bearing housing receives the second bearing and defines a third bore which aligns with the first and second bores. The first fastener is received in the second, first, and third bores to secure the first and second bearing housings to the stator assembly. The second fastener is spaced from the first fastener and secures the circuit board to the second bearing housing.

In another construction, the invention provides an electric machine having a stator assembly and a rotor assembly. The stator assembly includes a stator core and a coil supported by the stator core. The stator core includes a C-frame portion that defines a rotor opening and an I-bar portion that is formed of grain-oriented electric steel. The rotor assembly includes a shaft and a rotor supported by the shaft for rotation with the shaft relative to the stator core.

In another construction, the invention provides an electric machine having a stator assembly and a rotor assembly. The stator assembly includes a stator core and a coil assembly supported by the stator core. The stator core defines a rotor opening and the coil assembly includes a bobbin and a coil wound on the bobbin. The rotor assembly includes a shaft and a one-piece permanent magnet rotor supported by the shaft. The rotor rotates with the shaft relative to the stator core, includes first and second magnetic poles, is at least partially positioned in the rotor opening, and is in magnetic interaction with the stator core. At least a portion of the rotor and at least a portion of the shaft are encapsulated in a material that connects the rotor to the shaft.

In yet another construction, the invention provides an electric machine having a stator assembly, a rotor assembly, a sensor, and first and second bearing housings. The stator assembly includes a stator core and a coil assembly supported by the stator core. The stator core defines a rotor opening and the coil assembly includes a bobbin and a coil wound on the bobbin. The rotor assembly includes a shaft, a rotor supported by the shaft, and first and second bearings secured to the shaft on opposite sides of the rotor. The rotor rotates with the shaft relative to the stator core, includes at least first and second magnetic poles, is at least partially positioned in the rotor opening, and is in magnetic interaction with the stator core. The sensor is configured to detect magnetic polarities of the rotor and to generate a signal representing the detected magnetic polarities of the rotor. The signal is utilized to control a current through the coil. The first bearing housing receives the first bearing and the second bearing housing receives the second bearing. The second bearing housing defines a pocket that receives a portion of the sensor to locate the sensor relative to the rotor.

Further aspects of the invention, together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The invention is further described with reference to the accompanying drawings, which show constructions of the invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the invention. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" are used broadly and encompass both direct and indirect mountings, connections, supports, and couplings. Further, "connected" and "coupled" are not restricted to physical or mechanical connections or couplings.

FIG. 4 is a top view of the C-frame electric motor of FIG. 1.

FIG. 5 is a side view of the C-frame electric motor of FIG. 1.

FIG. 6 is a rear view of the C-frame electric motor of FIG. 1.

FIG. 7 is a perspective view of a second C-frame electric motor incorporating aspects of the invention.

FIG. 8 is a rear view of the C-frame electric motor of FIG. 7.

FIG. 9 is a side view of the C-frame electric motor of FIG. 7.

DETAILED DESCRIPTION

Figure 2:
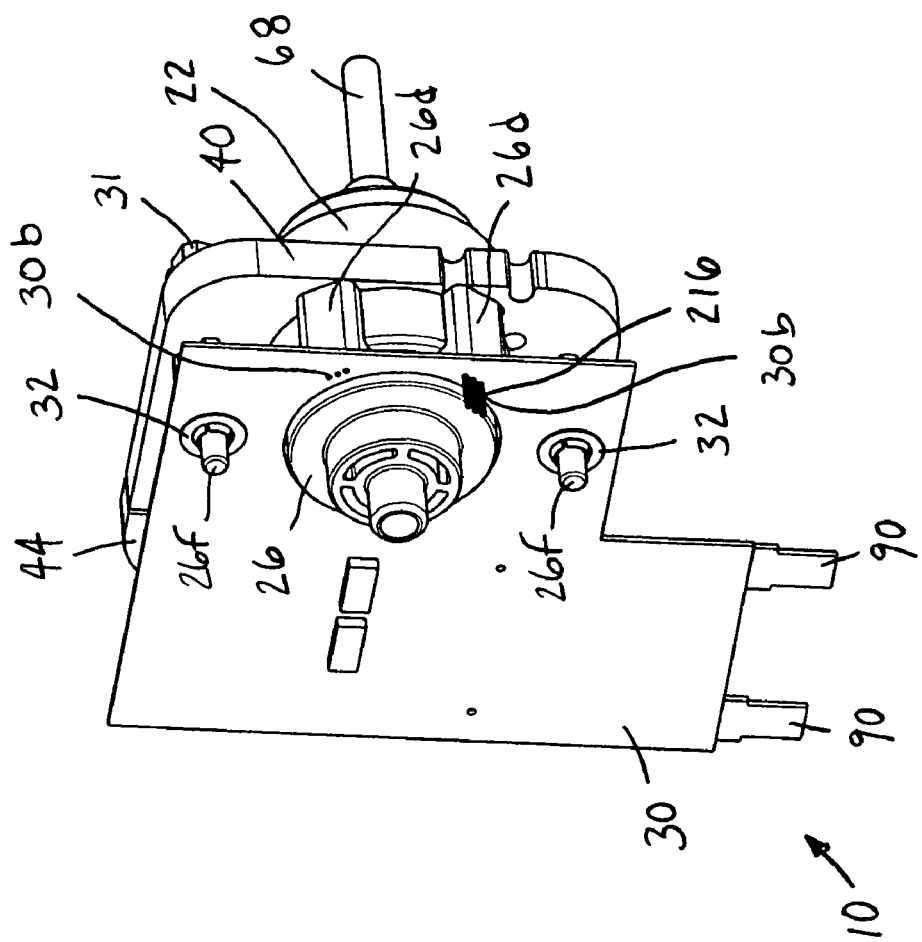
FIG. 2 is a perspective view of the C-frame electric motor of FIG. 1.

A first construction of an electric motor 10 is illustrated in FIGS. 1–6. A second construction of an electric motor 100 is illustrated in FIGS. 7–10. Each motor 10, 100 is a direct current ("DC"), brushless permanent magnet ("BLPM"), C-frame, electric motor. Similar components of the motors 10 and 100 are indicated using like reference numerals in the drawings. It should be understood that aspects of the invention may be utilized in other types of electric machines and the motors 10 and 100 are merely shown and described as two such examples.

Figure 3:
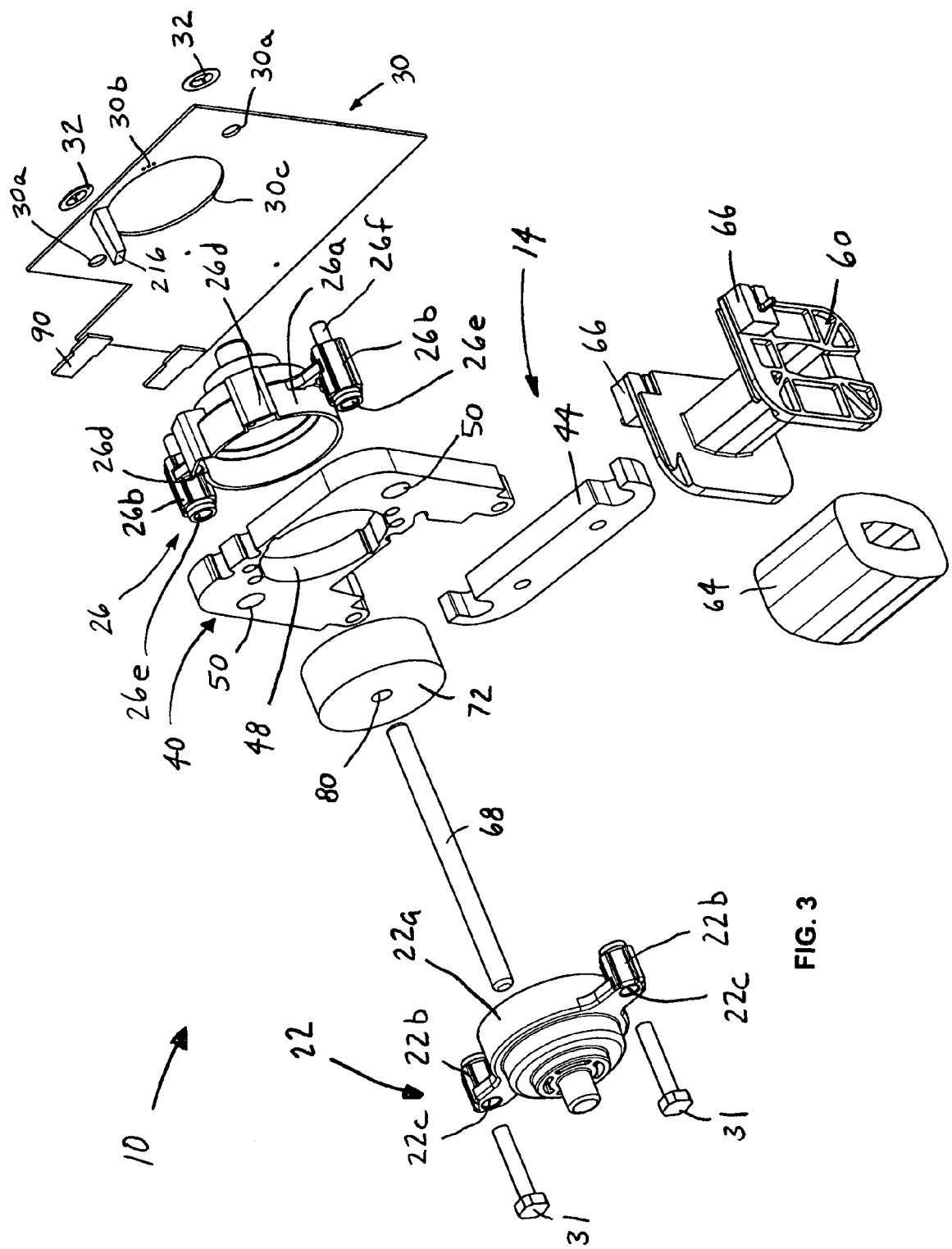
FIG. 3 is a partial exploded view of the C-frame electric motor of FIG. 1.
Figure 10:
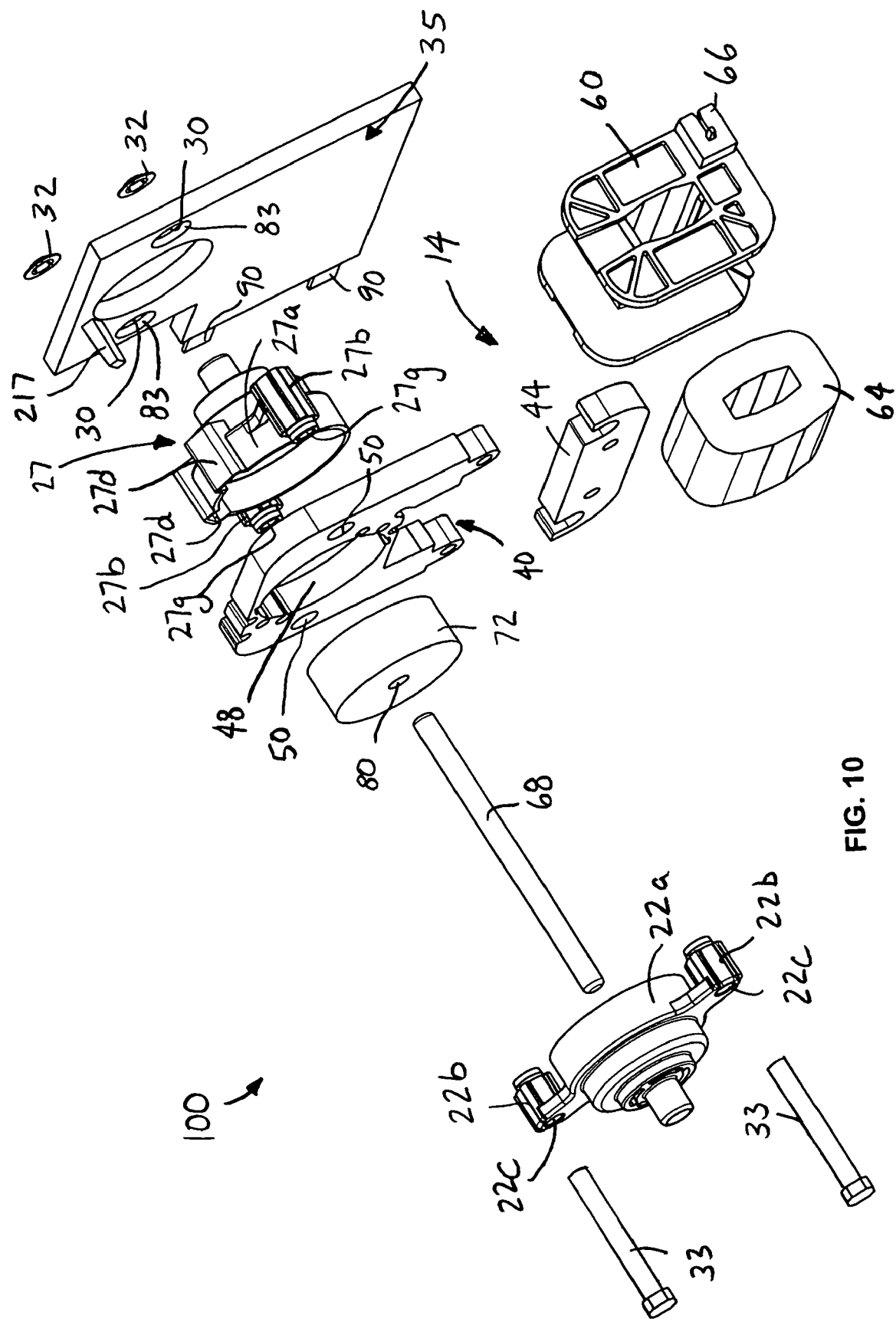
FIG. 10 is a partial exploded view of the C-frame electric motor of FIG. 7.

With reference to FIG. 3, the motor 10 includes a stator assembly 14, a rotor assembly 18 (FIG. 11), a first bearing housing 22, a second bearing housing 26, a circuit board 30, first fasteners 31, and second fasteners 32. With reference to FIG. 10, the motor 100 is similar to the motor 10 except it instead includes a second bearing housing 27, an encapsulated circuit board 35, and first fasteners 33.

Figure 11:
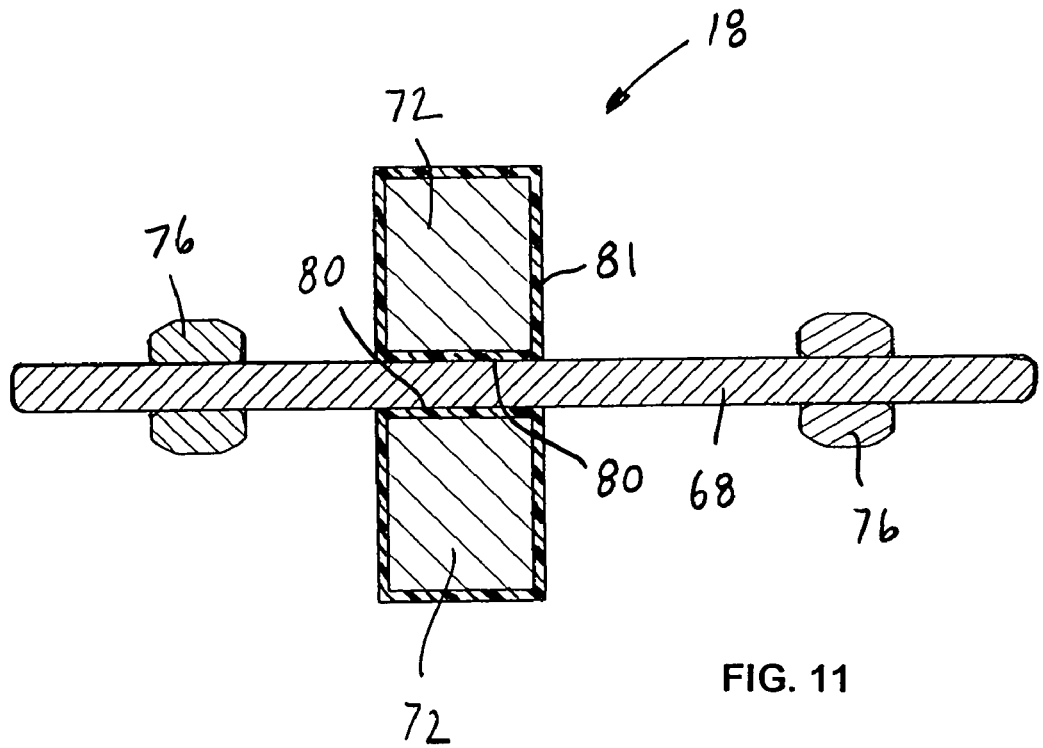
FIG. 11 is a sectional view of a rotor assembly of the C-frame electric motors shown in FIGS. 1 and 7.
Figure 14:
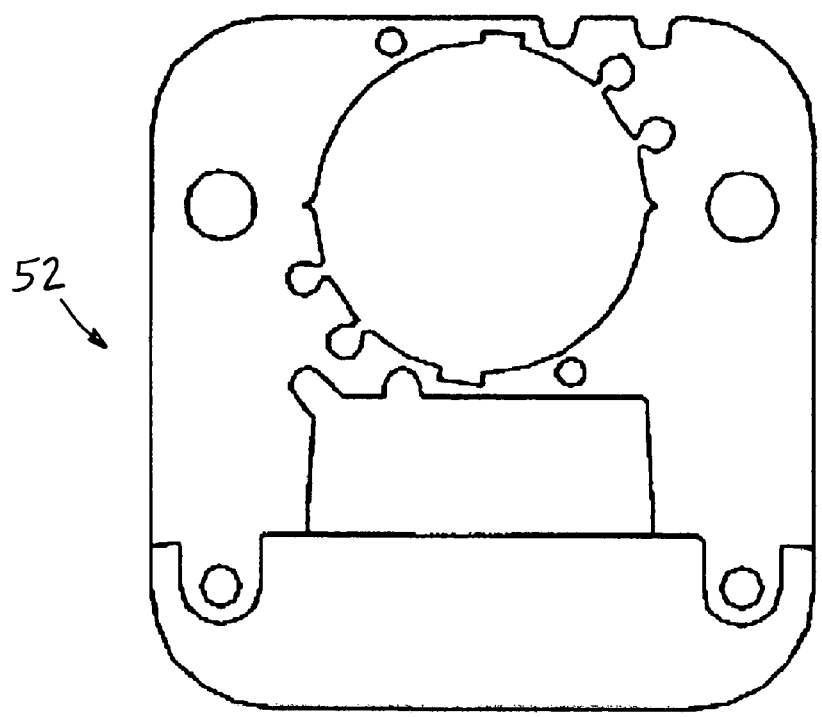
FIG. 14 is a lamination of a stator core of the C-frame electric motors shown in FIGS. 1 and 7.
Figure 15:
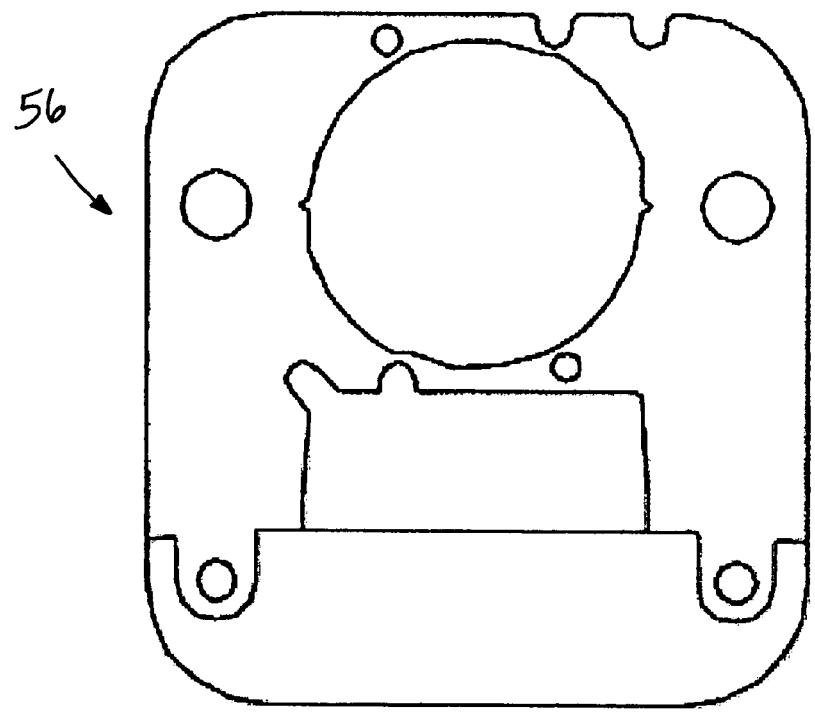
FIG. 15 is an alternative lamination for use in the stator core of the C-frame electric motors shown in FIGS. 1 and 7.

Referring to FIGS. 3 and 10, the stator assembly 14 includes a laminated core (i.e., stator core) and a coil assembly. The laminated core includes a C-frame portion 40 and an I-bar portion 44. The C-frame portion 40 defines a window or rotor opening 48 for receiving the rotor assembly 18 (FIG. 11). The C-frame portion 40 also defines bores 50 for receiving the first fasteners 31, 33. The illustrated bores 50 are through bores. The C-frame portion 40 and the I-bar portion 44 are each made of a plurality of laminations 52 (FIG. 14). The laminations 52 are held together using suitable means such as welding, adhesive bonding, mechanical fasteners (e.g., rivets), and the like. The size and power of the motor 10 are determined in part by the number of laminations 52. The illustrated laminations 52 are standard shaded pole motor laminations with the window 48 defining shaded pole recesses. In the illustrated constructions, the motor 10, 100 utilizes fewer of the laminations 52 than a shaded pole motor having similar performance specifications. In other constructions, the window 48 in the C-frame portion 40 is alternative shaped. For example, the window may form a tapered air gap between at least a portion of the laminated core and the rotor assembly 18. A lamination 56 having a window forming such a tapered air gap is shown in FIG. 15. In some constructions, a tapered air gap provides enhanced performance of the motor 10, 100. A tapered air gap may cause the rotor to park relative to the stator core in a consistent position, which may enhance the starting capability of the motor 10, 100. The shape of the tapered air-gap influences the back electromotive force (BEMF) waveform and therefore the electric current waveform and the running performance of the motor. A sensor (e.g., the sensor 216 discussed below) can be placed in any position adjacent to the tapered air gap, the position being selected to allow the improvement of motor performance (e.g., by phase advancement).

Figure 16:
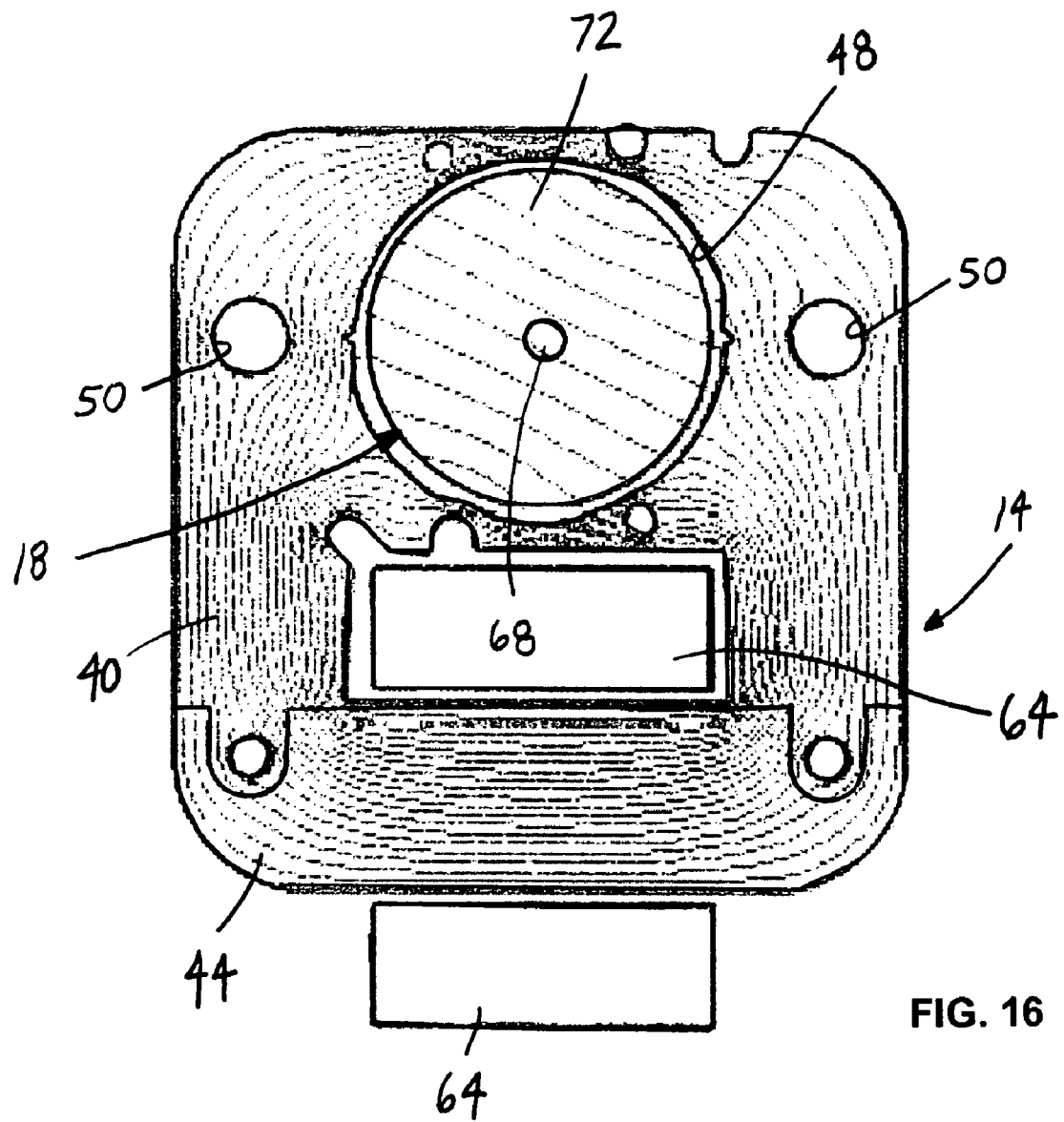
FIG. 16 schematically illustrates the magnetic interaction between a permanent magnet rotor and a stator core formed of the laminations of FIG. 15.

The C-frame and I-bar portions 40 and 44 of the laminations 52 are formed of non-grain-oriented electric steel, which is commonly employed for the manufacturing of rotating electrical machines. In some constructions, the I-bar portion 44 is formed using grain-oriented electric steel. With reference to FIG. 16, the magnetic flux lines in the I-bar portion 44 are substantially parallel to the longer edges of the I-bar portion 44. It is therefore advantageous to manufacture the I-bar 44 by stacking laminations of grain-oriented electric steel. In one construction, the I-bar portion 44 is oriented with the length along the preferred magnetization (or "easy" rolling) direction of the electric steel, i.e., the horizontal direction in FIG. 16. Such orientation reduces iron losses and increases magnetic permeance of the stator core. With continued reference to FIG. 16, the magnetic flux lines in the C-frame portion 40 have a different specific pattern. Accordingly, the C-frame portion 40 is formed using non-grain-oriented electric steel. The coil 64 is schematically illustrated in FIG. 16.

Figure 1:
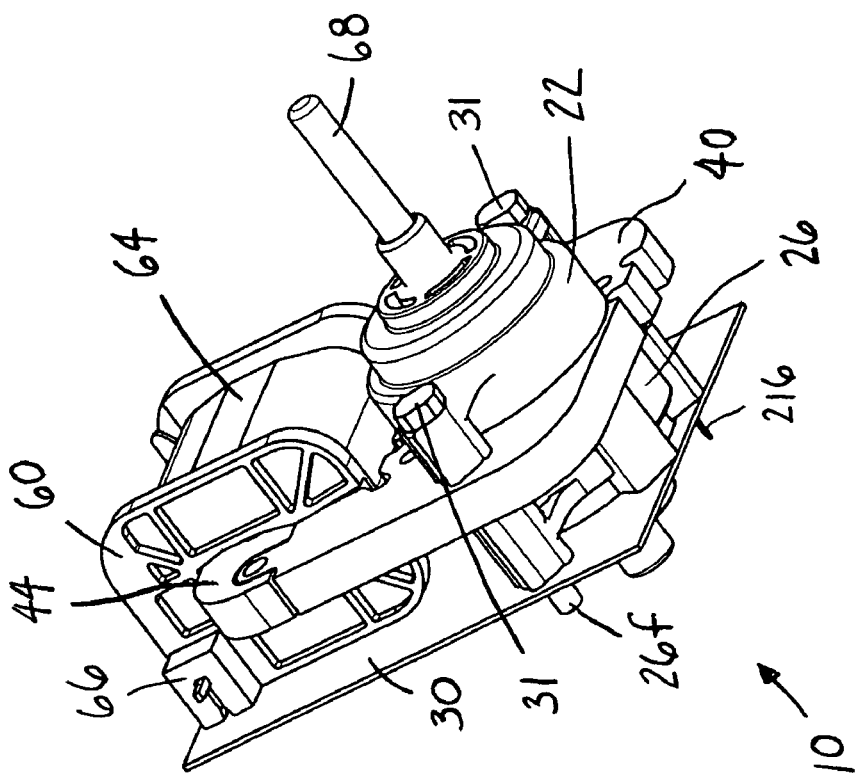
FIG. 1 is a perspective view of a first C-frame electric motor incorporating aspects of the invention.

The coil assembly includes a bobbin 60 and a coil 64 of wire wrapped around the bobbin 60. As illustrated in FIG. 1, the I-bar portion 44 extends through the center of the bobbin 60 to support the coil assembly on the laminated core. The bobbin 60 includes two terminal assemblies 66. End portions of the coil 64 are electrically connected to the circuit board 30 via the terminal assemblies 66. In the illustrated construction, the bobbin 60 is formed of a plastic material. In other constructions, the bobbin 60 is alternatively shaped and/or formed.

Figure 12:
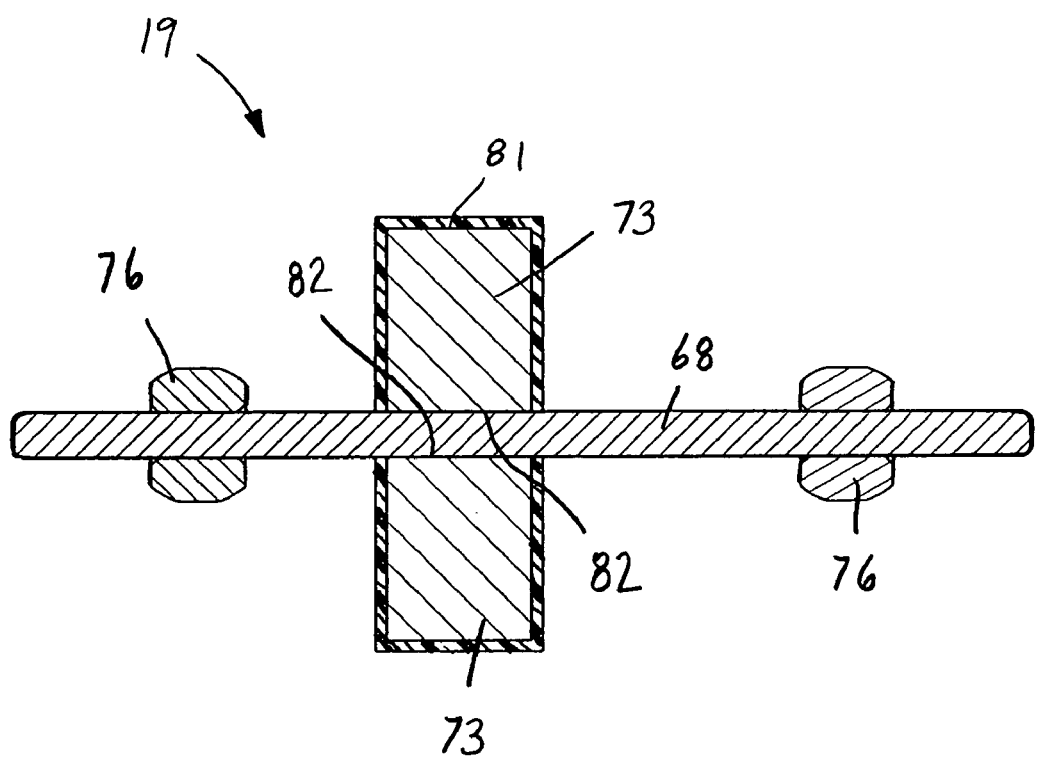
FIG. 12 is a sectional view of an alternative rotor assembly for the C-frame electric motors shown in FIGS. 1 and 7.

With reference to FIG. 11, the rotor assembly 18 includes a shaft 68, a rotor 72 supported by the shaft for rotation with the shaft 68 relative to the stator assembly 14, and bearings 76 secured to the shaft 68 on opposite sides of the rotor 72. The bearings 76 are schematically illustrated. The illustrated rotor 72 is a permanent magnet rotor that is formed as a solid ferrite cylinder having a first magnetic pole (e.g., a north magnetic pole) and a second magnetic pole (e.g., a south magnetic pole). The rotor 72 includes an axial bore 80 having an inner diameter that is larger than the outer diameter of the shaft 68. For assembly, the bore 80 of the rotor 72 is radially centered on the shaft 68, and the rotor 72 and a portion of the shaft 68 are encapsulated in a suitable encapsulation material 81 (e.g., a plastic material, an elastomeric material, a resin material, and the like). The encapsulation material 81 is between the rotor 72 and the shaft 68 and on the outer surfaces of the rotor 72. The encapsulation material 81 connects the rotor 72 to the shaft 68 without the use of adhesives (e.g., glue) or other fastening means which are typically utilized for such purposes, thus potentially simplifying the manufacturing process. The encapsulation material 81 also protects the rotor 72 from chipping, especially when the rotor 72 is formed of a brittle material such as ferrite. The shaft 68 extends axially from the rotor 72 and is supported on each end by the bearings 76. The bearings 76 are supported by respective bearing housings 22 and 26, 27. In other constructions, the rotor 72 is alternatively connected to the shaft 68 with the encapsulation material 81. A rotor assembly 19 is illustrated in FIG. 12 as an exemplary construction. The rotor assembly 19 is similar to the rotor assembly 18 except it instead includes a rotor 73. The rotor 73 includes an axial bore 82 having an inner diameter that is substantially equal to the outer diameter of the shaft 68. Accordingly, the encapsulation material 81 is not between the rotor 73 and the shaft 68. Instead, encapsulation material 81 on the axial ends of the rotor 73 connects the rotor 73 to the shaft 68.

With reference to FIGS. 3 and 10, the first bearing housing 22 includes a main body 22a and arm portions 22b that extend from the main body 22a. The main body 22a is sized to receive a respective bearing 76 (FIG. 11) and a portion of the rotor 72. As illustrated in FIG. 1, the shaft 68 extends through the main body 22a for connection to a load. Referring to FIGS. 3 and 10, each arm portion 22b defines a bore 22c for receiving a respective first fastener 31, 33. The illustrated bores 22c are through bores which align with the bores 50 in the C-frame portion 40.

Figure 17:
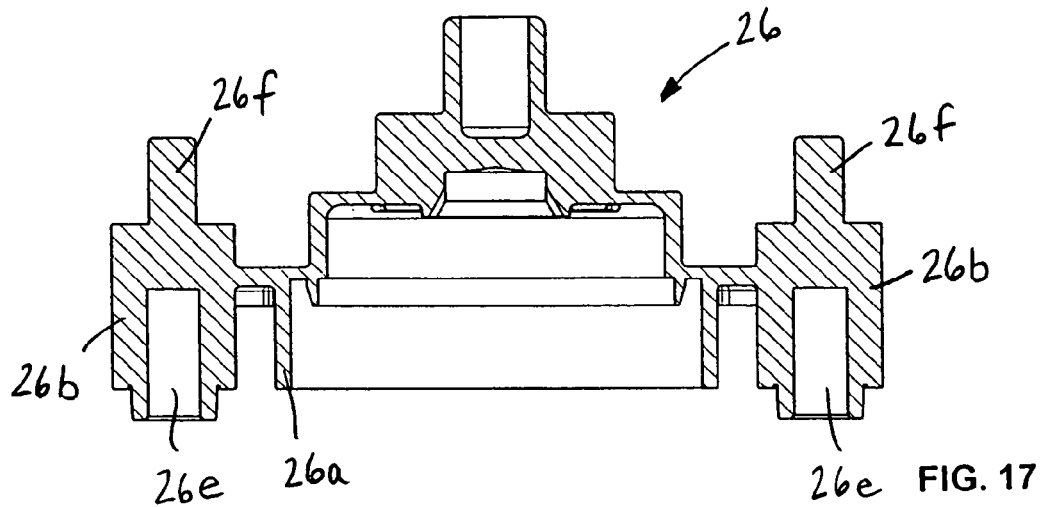
FIG. 17 is a sectional view of a bearing housing of the C-frame electric motor shown in FIG. 1.

With reference to FIGS. 3 and 17, the second bearing housing 26 also includes a main body 26a and arm portions 26b that extend from the main body 26a. In addition to being sized to receive a respective bearing 76 (FIG. 11) and a portion of the rotor 72, the main body 26a is also sized to receive an end portion of the shaft 68. The main body 26a defines alignment holes or sensor pockets 26d (FIGS. 2 and 3). Each arm portion 26b defines a bore 26e for receiving an end portion of a respective first fastener 31 and a projection 26f for receiving a respective second fastener 32. The illustrated bores 26e are blind bores that align with the bores 50 in the C-frame portion and the bores 22c of the first bearing housing 22. The illustrated projections 26f are integrally cast pins that are axially aligned with the bore 26e. In other constructions, the projections 26f are alternatively formed (e.g., threaded studs) and/or alternatively positioned on the second bearing housing 26.

Figure 18:
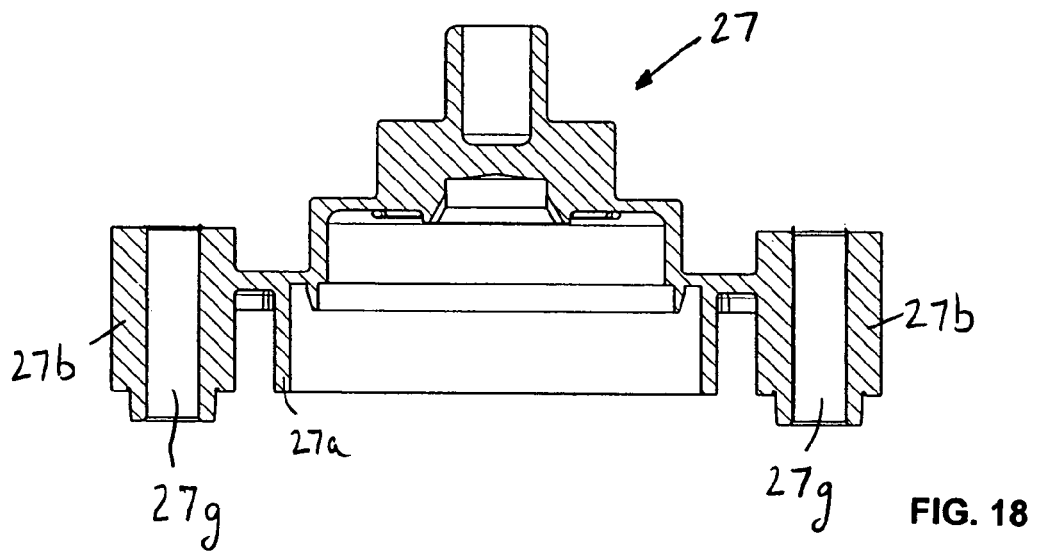
FIG. 18 is a sectional view of a bearing housing of the C-frame electric motor shown in FIG. 7.
Figure 19:
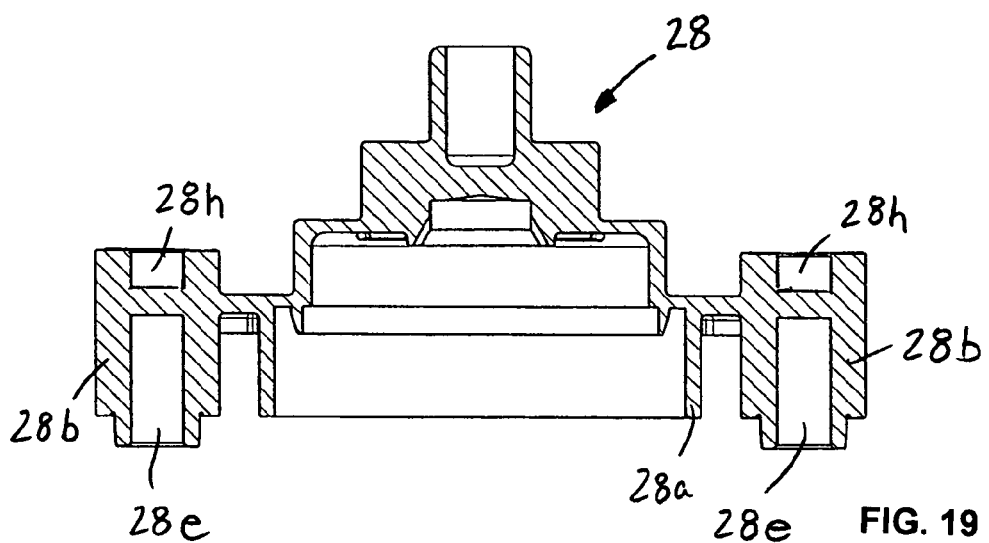
FIG. 19 is a sectional view of an alternative bearing housing for the C-frame electric motors shown in FIGS. 1 and 7.

With reference to FIGS. 10 and 18, the second bearing housing 27 is similar to the second bearing housing 26 (FIG. 3) except the second bearing housing 27 does not include projections similar to the projections 26f (FIG. 3). Further, the second bearing housing 27 includes through bores 27g instead of the blind bores 26e (FIG. 3). In other constructions, the second bearing housing 26, 27 is alternatively shaped and/or formed. In one exemplary alternative construction, a second bearing housing 28, shown in FIG. 19, is similar to the second bearing housing 26 (FIG. 3) except the second bearing housing 28 does not include projections similar to the projections 26f (FIG. 3) and the arm portions 28b each also define a bore 28h for receiving a fastener (e.g., a threaded fastener). The illustrated bores 28h are blind bores which are axially aligned with the bores 28e. The bores 28h can be alternatively positioned in other constructions.

Referring again to FIG. 3, the circuit board 30 supports a control circuit 200 (FIGS. 13) that is configured to receive power from a suitable power supply (e.g., a 120 volt, 60 Hz alternating current power supply) and control a current through the coil 64. In the illustrated constructions, and as described herein, controlling current through the coil 64 includes controlling a voltage applied to the coil 64. The voltage produces a current through the coil 64. The current establishes an armature reaction magnetic field in the air-gap that separates the laminated core and the rotor 72. The armature reaction field interacts with the permanent magnet rotor magnetization to produce a rotational torque and cause rotor movement. The values of the applied voltage and of the back electromotive force (BEMF) influence the values of the current through the coil 64, the armature field, and the torque produced at the shaft 68. In other constructions, the current may be alternatively controlled.

With reference to FIG. 2, the circuit board 30 includes terminals 90 that are electrically connectable to a power supply. However, the circuit board 30 can be connected to a power supply by other means. Referring back to FIG. 3, the circuit board 30 defines bores 30a for connection of the circuit board 30 to the second bearing housing 26, 27, 28. The illustrated bores 30a are through bores. In some constructions, the bores 30a align with the projections 26f of the second bearing housing 26. In other constructions, the bores 30a align with the bores 27g of the second bearing housing 27. In yet other constructions, the bores 30a align with the bores 28h of the second bearing housing 28.

The circuit board 30 also defines sets of sensor bores 30b and a bearing housing opening 30c. With reference to FIGS. 2, 3, 6–8, and 10, each illustrated set of sensor bores 30b aligns with a corresponding sensor pockets 26d, 27d, 28d in the second bearing housing 26, 27, 28, respectively. With continued reference to FIGS. 2, 3, 6–8, and 10, the illustrated bearing housing opening 30c is sized to receive a portion of the second bearing housing 26, 27, 28.

With reference to FIG. 10, the encapsulated circuit board 35 includes the circuit board 30 covered by a layer of encapsulation material 83 (e.g., a plastic material, an elastomeric material, a resin material, and the like). In one construction, the circuit board 30 is encapsulated using a co-molding (injection) process to form the encapsulated circuit board 35. In other constructions, the circuit board 30 may be alternatively encapsulated to form the circuit board 35. The encapsulation material 83 protects the circuit board 30 from environmental conditions (e.g., humidity) and vibration.

For assembly of the motor 10, the rotor assembly 18 is inserted in the window 48 and the first and second bearing housings 22 and 26 are positioned on opposite sides of the stator assembly 14 to receive a respective bearing 76. The first fasteners 31 are received in the bores 22c in the first bearing housing 22, the bores 50 in the C-frame portion 40, and the bores 26e in the second bearing housing 26. The illustrated first fasteners 31 are self-tapping screws that are tapped into the bores 26e to secure the first and second bearing housings 22 and 26 to the stator assembly 14. The rotor 72 is positioned for magnetic interaction with the stator assembly 18 when the motor 10 is assembled. In the illustrated construction, the rotor 72 extends axially beyond the stator core in each direction. The circuit board 30 is positioned adjacent the second bearing housing 26 so a portion of the second bearing housing 26 extends through the bearing housing opening 30c and a portion of the projections 26f extend through the bores 30a. The second fasteners 32 (e.g., push nuts) are connected to the portions of the projections 26f extending through the bores 30a to fixedly secure the circuit board 30 to the second bearing housing 26. Terminals on the circuit board 30 are positioned in the terminal assemblies 66 to electrically connected the circuit board 30 to the coil 64. Receipt of the circuit board terminals in the terminal assemblies 66 provides additional support to the circuit board 30.

The motor 100 is assembled similarly to the motor 10 except the first fasteners 33 also extend through the bores 27g of the second bearing housings 27 and the bores 30a of the circuit board 30. The first fasteners 33 are similar to the first fasteners 31 except the first fasteners 33 include a longer length than the first fasteners 31 thus allowing receipt of the first fasteners 33 in the bores 30a. The end portions of the first fasteners 33 that extend through the bores 30a are releasably secured by the second fasteners 32 (e.g., push nuts) to connect the circuit board 30 to the second bearing housing 27.

In other constructions, the circuit board 30 is connected to the second bearing housing 28. A motor including the second bearing housing 28 would include an assembly similar to the motor 10 except fasteners received in the bores 28h in the second bearing housing 28 would extend through the bores 30a instead of the projections 26f. In one exemplary construction, the fasteners received in the bores 28h are threaded studs to which fasteners (e.g., the second fasteners 32) are secured to connect the circuit board 30 to the second bearing housing 28. In another exemplary construction, the fasteners received in the bores 28h include a head positioned adjacent the circuit board 30 so the fasteners received in the bores 28h solely connect the circuit board 30 to the second bearing housing 28. Connection of the circuit board 30 to the second bearing housing 26, 28 without using the fasteners that secure the stator assembly, the rotor assembly, and the bearing housings together (e.g., the first fasteners 31) allows for replacement of the circuit board 30 and/or connection of the motor 10, 100 to a load without disturbing the factory established alignment between the stator and rotor assemblies 14 and 18.

Figure 13:
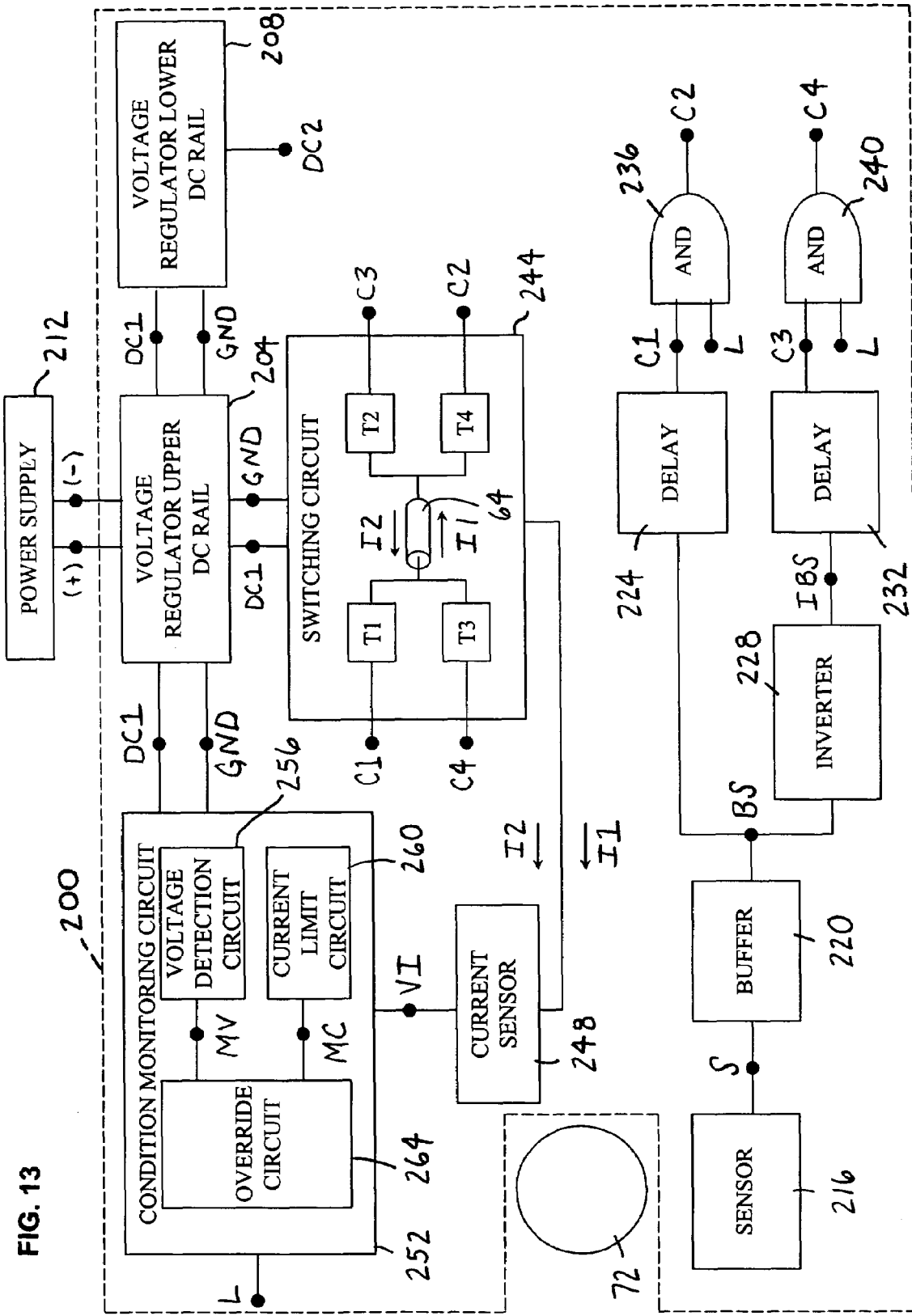
FIG. 13 schematically illustrates a functional diagram of a control circuit of the C-frame electric motors shown in FIGS. 1 and 7.

The control circuit 200 is schematically illustrated in FIG. 13. The control circuit 200 includes a first voltage regulator 204, a second voltage regulator 208, a single sensor 216, a buffer 220, a first delay 224, an inverter 228, a second delay 232, a first AND gate 236, a second AND gate 240, a switching circuit 244, a current sensor 248, and a condition monitoring circuit 252.

The first voltage regulator 204 utilizes power received from a power supply 212 (e.g., a 120 volt, 60 Hz alternating current power supply) to generate an upper rail direct current voltage DC1 and a ground GND. In one construction, the first voltage regulator 204 includes a capacitor-divider type voltage regulator with a zener diode that limits the upper rail direct current voltage DC1 by dissipating any extra energy as heat, thus eliminating the tendency of excess power input to increase the upper rail direct current voltage DC1. In the illustrated construction, the first voltage regulator 204 receives a power input from the power supply 212 via the terminals 90 (FIGS. 2 and 7).

The second voltage regulator 208 utilizes the upper rail direct current voltage DC1 to generate a lower rail direct current voltage DC2. The lower rail direct current voltage DC2 is utilized to power the sensor 216, the buffer 220, the first and second delays 224 and 232, the inverter 228, the first and second AND gates 236 and 240, and the condition monitoring circuit 252. In one construction, the second voltage regulator 208 is a linear voltage regulator. In other constructions, other types of power supplies (e.g., voltage regulators) may be utilized to provide power to the components of the control circuit 200.

The single sensor 216 (e.g., a Hall device) is selectively mounted in one of the sets of sensor bores 30b on the circuit board 30 so the sensor 216 extends from the circuit board 30 and is received adjacent a radial portion of the rotor 72 in the corresponding sensor pocket 26d, 27d, 28d of the second bearing housing 26, 27, 28. In the illustrated construction, a portion of the sensor 216 most outward from the circuit board 30 is positioned to contact an outer surface of the outermost lamination 52 of the stator core directly adjacent the window 48. Such placement maximizes the magnetic interaction between the rotor 72 and the sensor 216 without eliminating stator core material. The mounting of the sensor 216 may be selected based on the desired direction of rotation of the rotor 72 (e.g., clockwise, counter-clockwise). Placement of the sensor 216 in the sensor pocket 26d, 27d, 28d ensures proper alignment of the sensor 216 relative to the rotor 72, seals the rotor cavity, and protects the sensor from environmental conditions. For the encapsulated circuit board 35, the sensor 216 is connected to the circuit board 30 and positioned in a fixture to positively define a position of the sensor 216 relative to the circuit board 30. The circuit board 30 is then encapsulated in the encapsulation material 83, which maintains the position of the sensor 216 relative to the circuit board 30. The encapsulated sensor 217 (FIGS. 7–10) is then received in the corresponding sensor pocket 26d, 27d, 28d. In the illustrated construction, the outer diameter of the encapsulated sensor 217 is substantially equal to the inner diameter of the sensor pocket 26d, 27d, 28d.

The sensor 216 is configured to detect magnetic polarities of the rotor 72 as the rotor 72 rotates relative to the sensor 216. The sensor 216 generates a signal S representative of the detected magnetic polarities of the rotor 72. In the illustrated construction, the signal S is in a first state when the north magnetic pole of the rotor 72 is detected and a second state when the south magnetic pole of the rotor 72 is detected.

In one construction, the sensor 216 is a latching Hall effect sensor (e.g., model number HAL505UA-E provided by Micronas Intermetall of Freiburg, Germany). The sensor 216 generates a signal S which turns high (e.g., the first state) when a north magnetic pole of the rotor 72 is detected and turns low (e.g., the second state) when a south magnetic pole of the rotor 72 is detected. The signal S does not change if the magnetic field is removed. Instead, the opposite magnetic field polarity is detected to change the state of the signal S. In other constructions, other types of sensors having other types of outputs are utilized.

The buffer 220 receives an input representative of the signal S and generates a buffered signal BS that is isolated from the signal S. In one construction, the buffer 220 is an inverter. In other constructions, other types of buffers may be utilized.

The first delay 224 receives an input representative of the buffered signal BS and generates a first control signal C1. In one construction, the first delay 224 is a resistive-capacitance delay. The duration of the first delay 224 may be changed by changing the values of the components of the first delay 224.

The first AND gate 236 receives an input representative of the first control signal C1 and generates a second control signal C2. The second control signal C2 is identical to the first control signal C1 unless an override condition exists (as discussed below).

The inverter 228 also receives an input representative of the buffered signal BS and generates an inverted buffered signal IBS. In the illustrated construction, the inverted buffered signal EBS is logic high when the signal S is logic low and logic low when the signal S is logic high.

The second delay 232 receives an input representative of the inverted buffered signal IBS and generates a third control signal C3. The second delay 232 includes a construction similar to the first delay 224. In other constructions, other delay circuitry is utilized.

The second AND gate 240 receives an input representative of the third control signal C3 and generates a fourth control signal C4. The fourth control signal C4 is identical to the third control signal C3 unless an override condition exists (as discussed below).

The switching circuit 244 (e.g., an H-bridge circuit) is connected to the coil 64 via the terminal assemblies 66 (FIGS. 1 and 9). The switching circuit 244 allows current I1 through the coil 264 in a first direction when the signal S from the sensor 216 is in the first state and current I2 through the coil 264 in a second direction when the signal S from the sensor 216 is in the second state. The switching circuit 244 limits the current I1, I2 through the coil 64 when an override condition exists, regardless of the state of the signal S.

The illustrated switching circuit 244 includes first and second pairs of switching elements. The first pair of switching elements is formed of switching elements T1 and T4 and the second pair of switching elements is formed of switching elements T2 and T3. Switching elements T1 and T2 represent the high-side switching elements of the pairs and each receive the upper rail direct current voltage DC1. In one construction, the switching elements T1 and T2 are darlington transistors which provide current gain. The switching elements T3 and T4 represent the low-side switching elements of the pairs are each connected to the common rail of the switching circuit 244. The common rail is connected to ground GND through the current sensor 248. In one construction, the switching elements T3 and T4 are MOSFETS.

Each switching element T1, T2, T3, and T4 includes a conducting state and a non-conducting state. The state of the switching element T1 is controlled by the first control signal C1. In one construction, the first control signal C1 controls the state of the switching element T1 via a switch (e.g., a MOSFET). The state of the switching element T2 is controlled by the third control signal C3. In one construction, the third control signal C3 controls the state of the switching element T2 via a switch (e.g., a MOSFET). The state of the switching element T3 is controlled by the fourth control signal C4. The state of the switching element T4 is controlled by the second control signal C2. Accordingly, the first pair of switching elements is in a conducting state when both switching elements T1 and T4 are in a conducting state, and the first pair of switching elements is in a non-conducting state when at least one of the switching elements T1 and T4 is in a non-conducting state. Similarly, the second pair of switching elements is in a conducting state when both switching elements T2 and T3 are in a conducting state, and the second pair of switching elements is in a non-conducting state when at least one of the switching elements T2 and T3 is in a non-conducting state. The first and second delays 224 and 232 are utilized to ensure the first and second pairs of switching elements are not simultaneously in a conducting state. Simultaneous conductance of both pairs of switching elements may adversely effect the operation of the sensor 216, as well as shorting the upper rail direct current voltage DC1 to ground GND resulting in excessive power dissipation. Therefore, the second pair of switching elements is in a non-conducting state when the first pair of switching elements is in a conducting state and the first pair of switching elements is in a non-conducting state when the second pair of switching elements is in a conducting state. In other constructions, other types of switching circuits are utilized.

The current sensor 248 receives an input representative of the current I1, I2 through the coil 64 and generates a current signal VI representative of the current I1, I2 through the coil 64. In one construction, the current sensor 248 includes a resistor connected between the common rail of the switching circuit 244 and ground GND.

The condition monitoring circuit 252 includes a voltage detection circuit 256, a current limit circuit 260, and an override circuit 264. The voltage detection circuit 256 receives an input representative of the upper rail direct current voltage DC1 and generates a monitored voltage signal MV. The current limit circuit 260 receives an input representative of the current signal VI and generates a monitored current signal MC. The override circuit 264 receives an input representative of the monitored voltage signal MV and an input representative of the monitored current signal MC and generates an override condition signal L. The override condition signal L is in a first state (e.g., logic low) when an override condition exists and a second state (e.g., logic high) when an override condition does not exist. When in the first state, the override condition signal L limits the current I1, I2 through the coil 64 (i.e., an override condition exists). When in the second state, the override condition signal L allows the current I1, I2 through the coil 64 (i.e., an override condition does not exist).

In the illustrated construction, an override condition exists when the upper rail direct current voltage DC1 is below a predetermined value (e.g., below 80% of the expected upper rail direct current voltage DC1) and/or when the current signal VI is above a predetermined range (e.g., above 200 mA). In other constructions, the thresholds are alternatively established. If the upper rail direct current voltage DC1 is below a predetermined value, the switching circuit 244 may not operate properly. Similarly, if the monitored current signal is above a predetermined value, the current I1, I2 through the coil 64 may be exceeding acceptable limits (e.g., a locked rotor condition) or the efficiency of the motor 10, 100 may be being reduced.

The first and second AND gates 236 and 240 receive an input representative of the override condition signal L. If an override condition exists, the override condition signal L is utilized to control the second and fourth control signals C2 and C4. When the first and second control signals C1 and C2 are different, the switching circuit 244 limits the current I1 through the coil 64 in the first direction. When the third and fourth control signals C3 and C4 are different, the switching circuit 244 limits the current I2 through the coil 64 in the second direction. The switching circuit 244 limits current through the coil 64 by stopping the application of the upper rail direct current voltage DC1 to the coil 64. Current may continue to flow through portions of the switching circuit 244 after application of the upper rail direct current voltage DC1 is stopped.

In one construction, the condition monitoring circuit 252 includes a transistor-ORed circuit. The voltage detection circuit 256 includes a transistor that is turned ON when the upper rail direct current voltage DC1 is below a predetermined level and turned OFF when the upper rail direct current voltage DC1 is above the predetermined level. When the transistor is turned ON, the generated override signal L is in the first state (i.e., an override condition exists). When the transistor is turned OFF, the generated override signal L may be in the second state (i.e., an override condition does not exist). The current limit circuit 260 includes a transistor that turns ON when the current signal VI is above a predetermined value and turned OFF when the current signal VI is below the predetermined value. When the transistor is turned ON, the generated override signal L is in the first state (i.e., an override condition exists). When the transistor is turned OFF, the generated override signal L may be in the second state (i.e., an override condition does not exist). In the illustrated construction, the override signal L is in the second state when the transistors of each of the voltage detection circuit 256 and the current limit circuit 260 are turned OFF. In one construction, the override circuit 264 includes a buffer to buffer the voltage detection circuit 256 and the current limit circuit 260 from the switching circuit 244 and the upper rail direct current voltage DC1.

The illustrated control circuit 200 utilizes the condition monitoring circuit 252 and the delay circuits 224 and 232 to increase the efficiency of the motor 10, 100. The switching circuit 244 changes the direction of the current I1, I2 through the coil 64 to generate an alternating magnetic field in the laminated core. The magnetic field interacts with the permanent magnet rotor magnetization to produce a rotational torque and cause the rotor 72 to rotate with the shaft 68 relative to the laminated core. Continuous establishment of the current I1, I2 through the coil 64 is not necessary to cause the rotor 72 to rotate properly. Further, establishment of the current I1, I2 through the coil 64 may generate little or no torque output at the shaft 68 when the back electromotive force (BEMF) is low. Accordingly, such establishment of the current I1, I2 through the coil 64 results in reduced efficiency of the motor 10, 100. The illustrated motor 10, 100 includes at least two periods of limited current through the coil 64 for each revolution of the rotor 72. These periods reduce the amount of power input necessary to run the motor 10, 100. Accordingly, the efficiency of the motor 10, 100 is increased.

In the illustrated constructions, the periods of limited current through the coil 64 include periods of limited current through the coil 64 before and after the switching of the current I1, I2 in the coil 64 by the switching circuit 244. The periods of limited current through the coil 64 before switching of the current are established by setting the predetermined level of the current limit circuit to represent a value of current I1, I2 through the coil 64 just above an efficient limit (e.g., a value on the current curve where the back electromotive force (BEMF) is insufficient to generate a predetermined amount of torque output). When the current I1, I2 exceeds the efficient limit (e.g., 200 mA), additional application of power to the coil 64 results in wasted energy. Accordingly, the current limit circuit causes the condition monitoring circuit 252 to generate a logic low override condition signal L (i.e., an override condition exists). The switching circuit 244 thus limits current I1, I2 through the coil 64. The periods of limited current through the coil 64 after switching of the current are established by setting the delay duration of the delay circuits 224 and 232. The delay circuits 224 and 232 delay the application of the upper rail direct current voltage DC1 to the coil 64, and thus the establishment of current I1, I2 through the coil 64, after the switching of the current I1, I2 by the switching circuit 244. In the illustrated construction, the periods of no current through the coil 64 represent approximately four degrees of a full rotation of the rotor. The periods of no current through the coil 64 may be longer or shorter in other constructions.

In the illustrated constructions, the speed of the motor 10, 100 is pre-set and adjustable by changing the values of the components of the control circuit 200.

The specific motor constructions shown are for exemplary purposes. Aspects of the invention described herein may be used in other types of electric motors. Although the control circuit 200 is shown and described herein as having specific solid state electronic devices such as MOSFETS, resistors, transistors, AND gates, inverters, etc., it is to be understood that a wide variety of circuit elements could be chosen by those skilled in the art in order to achieve the advantages of the invention. In addition, those skilled in the art will recognize that some elements could be removed, added, or substituted with other elements. In some constructions, portions of the control circuit 200 can be implemented using a programmable device (e.g., a microprocessor, a microcontroller, a digital signal processor, etc.) that utilizes software stored in a memory.

The constructions described above and illustrated in the figures are presented by way of example only and are not intended as a limitation upon the concepts and principles of the invention. As such, it will be appreciated by one having ordinary skill in the art that various changes in the elements and their configuration and arrangement are possible without departing from the spirit and scope of the invention as set forth in the appended claims.

What is claimed is:

1. An electric machine comprising:
   a stator assembly having a stator core and a coil supported by the stator core;
   a rotor assembly having a shaft and a rotor supported by the shaft for rotation with the shaft relative to the stator core, the rotor having a first magnetic pole and a second magnetic pole, the rotor being in magnetic interaction with the stator core;

a single sensor configured to detect magnetic polarities of the rotor as the rotor rotates relative to the sensor and to generate a signal representing the detected magnetic polarities of the rotor, the signal being in a first state when the first magnetic pole is detected and a second state when the second magnetic pole is detected, the signal being inverted to form an inverted signal, the signal being utilized to control current through the coil in a first direction when the signal is in the first state and the inverted signal being utilized to control current through the coil in a second direction when the signal is in the second state, the current through the coil resulting in an alternating magnetic field in the stator core; and wherein at least a portion of the rotor and at least a portion of the shaft are encapsulated in an encapsulation material, and wherein the encapsulation material connects the rotor to the shaft.

2. An electric machine according to claim 1, wherein the sensor is a Hall effect sensor.

3. An electric machine according to claim 1, wherein the rotor extends axially beyond the stator core in at least one direction, and wherein the sensor is positioned adjacent an axial surface of the stator core and a radial surface of the rotor.

4. An electric machine according to claim 1, wherein the rotor is a permanent magnet rotor.

5. An electric machine according to claim 4, wherein the rotor includes a solid ferrite cylinder having a bore formed therein to receive at least a portion of the shaft.

6. An electric machine according to claim 1, wherein the stator core defines a rotor opening, wherein at least a portion of the rotor is positioned in the rotor opening, wherein the stator core is formed of a plurality of laminations, and wherein each lamination is formed so the rotor opening forms a tapered air gap between at least a portion of the stator core and a corresponding portion of the rotor.

7. An electric machine according to claim 1, wherein the stator assembly includes a plastic bobbin supported by the stator core, wherein the stator core includes a C-frame portion and an I-bar portion, and wherein the coil is wound around the plastic bobbin.

8. An electric machine according to claim 1, and further comprising a circuit board, wherein the sensor is mounted on the circuit board, and wherein the circuit board is at least partially encapsulated such that the position of the sensor is fixed relative to the circuit board.

9. An electric machine according to claim 8, wherein the sensor is entirely encapsulated.

10. An electric machine according to claim 1, wherein utilizing the signal to control current through the coil in a first direction includes utilizing the signal to control voltage applied to the coil to produce current through the coil in the first direction, and wherein utilizing the inverted signal to control current through the coil in a second direction includes utilizing the inverted signal to control voltage applied to the coil to produce current through the coil in the second direction.

11. An electric machine comprising:
a stator assembly having a stator core and a coil supported by the stator core;
a rotor assembly having a shaft and a rotor supported by the shaft for rotation with the shaft relative to the stator core, the rotor having a first magnetic pole and a second magnetic pole, the rotor being in magnetic interaction with the stator core;

a single sensor configured to detect magnetic polarities of the rotor as the rotor rotates relative to the sensor and to generate a signal representing the detected magnetic polarities of the rotor, the signal being in a first state when the first magnetic pole is detected and a second state when the second magnetic pole is detected, the signal being inverted to form an inverted signal, the signal being utilized to control current through the coil in a first direction when the signal is in the first state and the inverted signal being utilized to control current through the coil in a second direction when the signal is in the second state, the current through the coil resulting in an alternating magnetic field in the stator core; and wherein the stator assembly includes a plastic bobbin supported by the stator core, wherein the stator core includes a C-frame portion and an I-bar portion, wherein the coil is wound around the plastic bobbin, and wherein the I-bar portion is formed of grain-oriented electric steel.

12. An electric machine according to claim 11, wherein the C-frame portion is formed of non-grain-oriented electric steel.

13. An electric machine according to claim 11, wherein the rotor extends axially beyond the stator core in at least one direction, and wherein the sensor is positioned adjacent an axial surface of the stator core and a radial surface of the rotor.

14. An electric machine according to claim 11, wherein the rotor includes a solid ferrite cylinder having a bore formed therein to receive at least a portion of the shaft.

15. An electric machine according to claim 14 wherein at least a portion of the rotor and at least a portion of the shaft are encapsulated in an encapsulation material, and wherein the encapsulation material connects the rotor to the shaft.

16. An electric machine according to claim 11, wherein the stator core defines a rotor opening, wherein at least a portion of the rotor is positioned in the rotor opening, wherein the stator core is formed of a plurality of laminations, and wherein each lamination is formed so the rotor opening forms a tapered air gap between at least a portion of the stator core and a corresponding portion of the rotor.

17. An electric machine according to claim 11, and further comprising a circuit board, wherein the sensor is mounted on the circuit board, and wherein the circuit board is at least partially encapsulated such that the position of the sensor is fixed relative to the circuit board.

18. An electric machine according to claim 17, wherein the rotor assembly further includes first and second bearings secured to the shaft on opposite sides of the rotor, and further comprising a first bearing housing that receives the first bearing and a second bearing housing that receives the second bearing, wherein the second bearing housing includes a pocket that receives a portion of the encapsulated sensor, and wherein the pocket locates the sensor relative to the rotor.

19. An electric machine according to claim 11, wherein utilizing the signal to control current through the coil in a first direction includes utilizing the signal to control voltage applied to the coil to produce current through the coil in the first direction, and wherein utilizing the inverted signal to control current through the coil in a second direction includes utilizing the inverted signal to control voltage applied to the coil to produce current through the coil in the second direction.

20. An electric machine comprising:
a stator assembly having a stator core and a coil supported by the stator core; a rotor assembly having a shaft and a rotor supported by the shaft for rotation with the shaft relative to the stator core, the rotor having a first magnetic pole and a second magnetic pole, the rotor being in magnetic interaction with the stator core;
a single sensor configured to detect magnetic polarities of the rotor as the rotor rotates relative to the sensor and to generate a signal representing the detected magnetic polarities of the rotor, the signal being in a first state when the first magnetic pole is detected and a second state when the second magnetic pole is detected, the signal being inverted to form an inverted signal, the signal being utilized to control current through the coil in a first direction when the signal is in the first state and the inverted signal being utilized to control current through the coil in a second direction when the signal is in the second state, the current through the coil resulting in an alternating magnetic field in the stator core;
a circuit board;
wherein the sensor is mounted on the circuit board, wherein the circuit board is at least partially encapsulated such that the position of the sensor is fixed relative to the circuit board; and
wherein the rotor assembly further includes first and second bearings secured to the shaft on opposite sides of the rotor, and further comprising a first bearing housing that receives the first bearing and a second bearing housing that receives the second bearing, wherein the second bearing housing includes a pocket that receives a portion of the encapsulated sensor, and wherein the pocket locates the sensor relative to the rotor.

21. An electric machine according to claim 20, wherein the rotor extends axially beyond the stator core in at least one direction, and wherein the sensor is positioned adjacent an axial surface of the stator core and a radial surface of the rotor.

22. An electric machine according to claim 21, wherein the rotor includes a solid ferrite cylinder having a bore formed therein to receive at least a portion of the shaft.

23. An electric machine according to claim 20, wherein at least a portion of the rotor and at least a portion of the shaft are encapsulated in an encapsulation material, and wherein the encapsulation material connects the rotor to the shaft.

24. An electric machine according to claim 20, wherein the stator core defines a rotor opening, wherein at least a portion of the rotor is positioned in the rotor opening, wherein the stator core is formed of a plurality of laminations, and wherein each lamination is formed so the rotor opening forms a tapered air gap between at least a portion of the stator core and a corresponding portion of the rotor.

25. An electric machine according to claim 20, wherein the stator assembly includes a plastic bobbin supported by the stator core, wherein the stator core includes a C-frame portion and an I-bar portion, and wherein the coil is wound around the plastic bobbin.

26. An electric machine according to claim 25, wherein the I-bar portion is formed of grain-oriented electric steel, and wherein the C-frame portion is formed of non-grain-oriented electric steel.

27. An electric machine according to claim 20, wherein utilizing the signal to control current through the coil in a first direction includes utilizing the signal to control voltage applied to the coil to produce current through the coil in the first direction, and wherein utilizing the inverted signal to control current through the coil in a second direction includes utilizing the inverted signal to control voltage applied to the coil to produce current through the coil in the second direction.

28. An electric machine comprising:
a stator assembly having a stator core and a coil assembly supported by the stator core, the stator core defining a rotor opening, the coil assembly including a bobbin and a coil wound on the bobbin;
a rotor assembly having a shaft and a permanent magnet rotor supported by the shaft, the rotor rotating with the shaft relative to the stator core, having a first magnetic pole and a second magnetic pole, being at least partially positioned in the rotor opening, and being in magnetic interaction with the stator core;
a control circuit configured to receive power from a power supply and control a current through the coil, the current creating an alternating magnetic field in the stator core, the control circuit including
a single Hall device detecting magnetic polarities of the rotor as the rotor rotates relative to the Hall device and generating a signal representative of the detected magnetic polarities of the rotor, the signal being in a first state when the first magnetic pole is detected and a second state when the second magnetic pole is detected,
an inverter inverting the signal to generate an inverted signal, and
a switching circuit being connected to the coil and receiving an input representative of the signal and an input representative of the inverted signal, the input representative of the signal being utilized to control operation of the switching circuit to allow the current through the coil in a first direction when the signal is in the first state, and the input representative of the inverted signal being utilized to control operation of the switching circuit to allow the current through the coil in a second direction when the signal is in the second state; and
wherein the control circuit further includes a current limit circuit that monitors the current through the coil in each of the first and second directions and generates a current signal representative of a monitored current through the coil, wherein the current signal is utilized to allow the current through the coil when a value of the monitored current is in a predefined range and limit current through the coil when a value of the monitored current is above the predefined range.

29. An electric machine according to claim 28, wherein the control circuit includes a buffer gate, and wherein the buffer gate receives an input representative of the signal and generates a buffered signal that is isolated from the signal.

30. An electric machine according to claim 28, wherein the switching circuit includes a bridge circuit having first and second pairs of switching elements, each pair of switching elements having a conducting state and a non-conducting state, wherein the first pair of switching elements can be in a conducting state to allow the current through the coil in the first direction when the signal is in the first state, wherein the second pair of switching elements is in a non-conducting state when the signal is in the first state, wherein the second pair of switching elements can be in a conducting state to allow the current through the coil in the second direction when the signal is in the second state, and wherein the first pair of switching elements is in a non-conductive state when the signal is in the second state.

31. An electric machine according to claim 30, wherein the first pair of switching elements are in a conducting state to allow current through the coil in the first direction when the signal is in the first state unless an override condition exists, and wherein the second pair of switching elements are in a conducting state to allow current through the coil in the second direction when the signal is in the second state unless the override condition exists.

32. An electric machine according to claim 31, wherein the override condition exists when the current through the coil exceeds a predetermined value.

33. An electric machine according to claim 31, wherein the control circuit further includes a voltage regulator to generate a direct current rail voltage, and wherein the override condition exists when the rail voltage is below a predetermined value.

34. An electric machine according to claim 30, wherein the control circuit further includes a delay circuit, wherein the delay circuit receives an input representative of the signal and generates a delayed signal that is delayed relative to the signal, and wherein the delayed signal is utilized to control operation of the switching circuit such that the first and second pairs of switching elements are prevented from each being simultaneously in a conducting state.

35. An electric machine according to claim 28, wherein the control circuit further includes a first AND gate, wherein the first AND gate receives an input representative of the signal and generates a first output, and wherein the first output is utilized to control operation of the switching circuit.

36. An electric machine according to claim 35, wherein the control circuit further includes an inverter and a second AND gate, wherein the inverter receives an input representative of the signal and generates an inverted signal, wherein the second AND gate receives an input representative of the inverted signal and generates a second output, and wherein the second output is utilized to control operation of the switching circuit.

37. An electric machine according to claim 28, wherein utilizing the input representative of the signal to control operation of the switching circuit to allow the current through the coil in a first direction includes utilizing the input representative of the signal to control operation of the switching circuit to apply voltage to the coil to produce current through the coil in the first direction, and wherein utilizing the input representative of the inverted signal to control operation of the switching circuit to allow the current through the coil in a second direction includes utilizing the input representative of the inverted signal to control operation of the switching circuit to apply voltage to the coil to produce current through the coil in the second direction.

38. An electric machine comprising:
a stator assembly having a stator core and a coil assembly supported by the stator core, the stator core defining a rotor opening, the coil assembly including a bobbin and a coil wound on the bobbin;
a rotor assembly having a shaft and a permanent magnet rotor supported by the shaft, the rotor rotating with the shaft relative to the stator core, having a first magnetic pole and a second magnetic pole, being at least partially positioned in the rotor opening, and being in magnetic interaction with the stator core;
a control circuit configured to receive power from a power supply and control a current through the coil, the current creating an alternating magnetic field in the stator core, the control circuit including a single Hall device detecting magnetic polarities of the rotor as the rotor rotates relative to the Hall device and generating a signal representative of the detected magnetic polarities of the rotor, the signal being in a first state when the first magnetic pole is detected and a second state when the second magnetic pole is detected,
an inverter inverting the signal to generate an inverted signal, and
a switching circuit being connected to the coil and receiving an input representative of the signal and an input representative of the inverted signal, the input representative of the signal being utilized to control operation of the switching circuit to allow the current through the coil in a first direction when the signal is in the first state, and the input representative of the inverted signal being utilized to control operation of the switching circuit to allow the current through the coil in a second direction when the signal is in the second state; and
wherein the control circuit generates a direct current rail voltage, wherein the control circuit further includes a voltage detection circuit that monitors the rail voltage and generates a voltage signal representative of a monitored rail voltage, and wherein the voltage signal is utilized to allow current through the coil when a value of the monitored rail voltage is in a predefined range and limit current through the coil when a value of the monitored rail voltage is below the predefined range.

39. An electric machine according to claim 38, wherein the control circuit includes a buffer gate, and wherein the buffer gate receives an input representative of the signal and generates a buffered signal that is isolated from the signal.

40. An electric machine according to claim 38, wherein the switching circuit includes a bridge circuit having first and second pairs of switching elements, each pair of switching elements having a conducting state and a non-conducting state, wherein the first pair of switching elements can be in a conducting state to allow the current through the coil in the first direction when the signal is in the first state, wherein the second pair of switching elements is in a non-conducting state when the signal is in the first state, wherein the second pair of switching elements can be in a conducting state to allow the current through the coil in the second direction when the signal is in the second state, and wherein the first pair of switching elements is in a non-conductive state when the signal is in the second state.

41. An electric machine according to claim 40, wherein the first pair of switching elements are in a conducting state to allow current through the coil in the first direction when the signal is in the first state unless an override condition exists, and wherein the second pair of switching elements are in a conducting state to allow current through the coil in the second direction when the signal is in the second state unless the override condition exists.

42. An electric machine according to claim 41, wherein the override condition exists when the current through the coil exceeds a predetermined value.

43. An electric machine according to claim 41, wherein the control circuit further includes a voltage regulator to generate a direct current rail voltage, and wherein the override condition exists when the rail voltage is below a predetermined value.

44. An electric machine according to claim 40, wherein the control circuit further includes a delay circuit, wherein the delay circuit receives an input representative of the signal and generates a delayed signal that is delayed relative to the signal, and wherein the delayed signal is utilized to control operation of the switching circuit such that the first and second pairs of switching elements are prevented from each being simultaneously in a conducting state.

45. An electric machine according to claim 38, wherein the control circuit further includes a first AND gate, wherein the first AND gate receives an input representative of the signal and generates a first output, and wherein the first output is utilized to control operation of the switching circuit.

46. An electric machine according to claim 45, wherein the control circuit further includes an inverter and a second AND gate, wherein the inverter receives an input representative of the signal and generates an inverted signal, wherein the second AND gate receives an input representative of the inverted signal and generates a second output, and wherein the second output is utilized to control operation of the switching circuit.

47. An electric machine according to claim 38, wherein utilizing the input representative of the signal to control operation of the switching circuit to allow the current through the coil in a first direction includes utilizing the input representative of the signal to control operation of the switching circuit to apply voltage to the coil to produce current through the coil in the first direction, and wherein utilizing the input representative of the inverted signal to control operation of the switching circuit to allow the current through the coil in a second direction includes utilizing the input representative of the inverted signal to control operation of the switching circuit to apply voltage to the coil to produce current through the coil in the second direction.

48. An electric machine comprising:
a stator assembly having a stator core and a coil assembly supported by the stator core, the stator core defining a rotor opening, the coil assembly including a bobbin and a coil wound on the bobbin;
a rotor assembly having a shaft and a permanent magnet rotor supported by the shaft, the rotor rotating with the shaft relative to the stator core, having a first magnetic pole and a second magnetic pole, being at least partially positioned in the rotor opening, and being in magnetic interaction with the stator core;
a control circuit configured to receive power from a power supply and control a current through the coil, the current creating an alternating magnetic field in the stator core, the control circuit including
a single Hall device detecting magnetic polarities of the rotor as the rotor rotates relative to the Hall device and generating a signal representative of the detected magnetic polarities of the rotor, the signal being in a first state when the first magnetic pole is detected and a second state when the second magnetic pole is detected,
an inverter inverting the signal to generate an inverted signal, and
a switching circuit being connected to the coil and receiving an input representative of the signal and an input representative of the inverted signal, the input representative of the signal being utilized to control operation of the switching circuit to allow the current through the coil in a first direction when the signal is in the first state, and the input representative of the inverted signal being utilized to control operation of the switching circuit to allow the current through the coil in a second direction when the signal is in the second state;
wherein the control circuit further includes an inverter and a second AND gate, wherein the inverter receives an input representative of the signal and generates an inverted signal, wherein the second AND gate receives an input representative of the inverted signal and generates a second output, and wherein the second output is utilized to control operation of the switching circuit; and
wherein the control circuit further includes a condition monitoring circuit, wherein the condition monitoring circuit receives an input representative of the current through the coil, receives an input representative of a direct current rail voltage, and generates a third output, wherein the first and second AND gates each also receive an input representative of the third output and utilize the input representative of the third output when generating the first and second outputs, respectively.

49. An electric machine according to claim 48, wherein the third output is in a third state when each of the input representative of the current through the coil and the input representative of a direct current rail voltage are in an acceptable range, and wherein the third output is in a fourth state when at least one of the input representative of the current through the coil and the input representative of a direct current rail voltage is outside the acceptable range, and wherein the third output is utilized to limit current through the coil when the third output is in the fourth state.

50. An electric machine comprising:
a stator assembly having a stator core and a coil supported by the stator core; a rotor assembly having a shaft and a rotor supported by the shaft for rotation with the shaft relative to the stator core, the rotor having a first magnetic pole and a second magnetic pole, the rotor being in magnetic interaction with the stator core;
a single sensor configured to detect magnetic polarities of the rotor as the rotor rotates relative to the sensor and to generate a signal representing the detected magnetic polarities of the rotor, the signal being in a first state when the first magnetic pole is detected and a second state when the second magnetic pole is detected, the signal being inverted to form an inverted signal, the signal being utilized to control current through the coil in a first direction when the signal is in the first state and the inverted signal being utilized to control current through the coil in a second direction when the signal is in the second state, the current through the coil resulting in an alternating magnetic field in the stator core; and
wherein the stator core defines a first bore, wherein the rotor assembly further comprises first and second bearings secured to the shaft on opposite sides of the rotor, and wherein the electrical machine further comprises
a first bearing housing that receives the first bearing and defines a second bore which aligns with the first bore;
a second bearing housing that receives the second bearing and defines a third bore which aligns with the first and second bores;
a first fastener received in the second, first, and third bores to secure the first and second bearing housings to the stator assembly with the first and second bearings received at least partially within the first and second bearing housings, respectively;
a circuit board; and
a second fastener that secures the circuit board to the second bearing housing, the second fastener being spaced from the first fastener.

51. An electric machine according to claim 50, wherein the first fastener is a threaded fastener, and wherein the third bore receives an end portion of the threaded fastener.

52. An electric machine according to claim 50, wherein the second fastener is a push nut.

53. An electric machine according to claim 50, wherein the second fastener is a threaded fastener.

54. An electric machine according to claim 50, wherein the second bearing housing defines a projection, wherein the circuit board defines a fourth bore which aligns with the projection, and wherein the second fastener engages the projection to secure the circuit board to the second bearing housing.

55. An electric machine according to claim 54, wherein a portion of the projection extends through the fourth bore, and wherein the second fastener engages the portion of the projection that extends through the fourth bore to secure the circuit board to the second bearing housing.

56. An electric machine according to claim 54, wherein the projection is a pin cast on the second bearing bracket.

57. An electric machine according to claim 56, wherein the pin aligns with the first, second, and third bores.

58. An electric machine according to claim 50, wherein the second bearing housing defines a fourth bore, and wherein the fourth bore receives an end portion of the second fastener to secure the circuit board to the second bearing housing.

59. An electric machine according to claim 58, wherein the circuit board defines a fifth bore which aligns with the fourth bore, and wherein the second fastener extends through the fifth bore to secure the circuit board to the second bearing housing.

60. An electric machine according to claim 59, wherein the fourth bore is a blind bore.

61. An electric machine according to claim 50, wherein the stator assembly includes a plastic bobbin supported by the stator core, wherein the stator core includes a C-frame portion and an I-bar portion, and wherein the coil is wound on the plastic bobbin.

62. An electric machine according to claim 50, wherein the first bore is a through bore, wherein the second bore is a through bore, and wherein the third bore is a blind bore.

63. An electric machine comprising:
a stator assembly having a stator core and a coil assembly supported by the stator core, the stator core defining a rotor opening, the coil assembly including a bobbin and a coil wound on the bobbin;
a rotor assembly having a shaft and a permanent magnet rotor supported by the shaft, the rotor rotating with the shaft relative to the stator core, having a first magnetic pole and a second magnetic pole, being at least partially positioned in the rotor opening, and being in magnetic interaction with the stator core;
a control circuit configured to receive power from a power supply and control a current through the coil, the current creating an alternating magnetic field in the stator core, the control circuit including
a single Hall device detecting magnetic polarities of the rotor as the rotor rotates relative to the Hall device and generating a signal representative of the detected magnetic polarities of the rotor, the signal being in a first state when the first magnetic pole is detected and a second state when the second magnetic pole is detected,
an inverter inverting the signal to generate an inverted signal, and
a switching circuit being connected to the coil and receiving an input representative of the signal and an input representative of the inverted signal, the input representative of the signal being utilized to control operation of the switching circuit to allow the current through the coil in a first direction when the signal is in the first state, and the input representative of the inverted signal being utilized to control operation of the switching circuit to allow the current through the coil in a second direction when the signal is in the second state; and
wherein the stator core includes a C-frame portion that defines the rotor opening and an I-bar portion that is formed of grain-oriented electric steel.

64. An electric machine according to claim 63, wherein the stator assembly includes a plastic bobbin supported by the stator core, and wherein the coil is wound on the plastic bobbin.

65. An electric machine according to claim 63, wherein the C-frame portion is formed of non-grain-oriented electric steel.

66. An electric machine according to claim 63, wherein the rotor is a permanent magnet rotor.

67. An electric machine according to claim 63, wherein the I-bar portion generally defines a length and a width, and wherein the length of the I-bar portion is oriented substantially along the preferred magnetization direction of the grain-oriented electric steel.

68. An electric machine comprising:
a stator assembly having a stator core and a coil assembly supported by the stator core, the stator core defining a rotor opening, the coil assembly including a bobbin and a coil wound on the bobbin;
a rotor assembly having a shaft and a permanent magnet rotor supported by the shaft, the rotor rotating with the shaft relative to the stator core, having a first magnetic pole and a second magnetic pole, being at least partially positioned in the rotor opening, and being in magnetic interaction with the stator core;
a control circuit configured to receive power from a power supply and control a current through the coil, the current creating an alternating magnetic field in the stator core, the control circuit including
a single Hall device detecting magnetic polarities of the rotor as the rotor rotates relative to the Hall device and generating a signal representative of the detected magnetic polarities of the rotor, the signal being in a first state when the first magnetic pole is detected and a second state when the second magnetic pole is detected,
an inverter inverting the signal to generate an inverted signal, and
a switching circuit being connected to the coil and receiving an input representative of the signal and an input representative of the inverted signal, the input representative of the signal being utilized to control operation of the switching circuit to allow the current through the coil in a first direction when the signal is in the first state, and the input representative of the inverted signal being utilized to control operation of the switching circuit to allow the current through the coil in a second direction when the signal is in the second state; and
wherein at least a portion of the rotor and at least a portion of the shaft are encapsulated in an encapsulation material that connects the rotor to the shaft.

69. An electric machine according to claim 68, wherein the encapsulation material is a plastic material.

70. An electric machine according to claim 68, wherein the rotor is fully encapsulated by the encapsulation material.

71. An electric machine according to claim 68, wherein the rotor includes a solid ferrite cylinder having a bore formed therein to receive at least a portion of the shaft.

72. An electric machine comprising:

a stator assembly having a stator core and a coil supported by the stator core;

a rotor assembly having a shaft and a rotor supported by the shaft for rotation with the shaft relative to the stator core, the rotor having a first magnetic pole and a second magnetic pole, the rotor being in magnetic interaction with the stator core;

a single sensor configured to detect magnetic polarities of the rotor as the rotor rotates relative to the sensor and to generate a signal representing the detected magnetic polarities of the rotor, the signal being in a first state when the first magnetic pole is detected and a second state when the second magnetic pole is detected, the signal being inverted to form an inverted signal, the signal being utilized to control current through the coil in a first direction when the signal is in the first state and the inverted signal being utilized to control current through the coil in a second direction when the signal is in the second state, the current through the coil resulting in an alternating magnetic field in the stator core; and wherein the stator core defines a rotor opening, and wherein the electric machine further comprises a coil assembly supported by the stator core, the coil assembly including a bobbin and a coil wound on the bobbin;

first and second bearings secured to the shaft on opposite sides of the rotor;

a first bearing housing that receives the first bearing; and a second bearing housing that receives the second bearing, the second bearing housing defining a pocket that receives a portion of the sensor to locate the sensor relative to the rotor.

73. An electric machine according to claim 72, wherein the pocket is cast in the second bearing housing.

74. An electric machine according to claim 72, wherein the portion of the sensor received in the pocket is encapsulated.

* * * * *